United States Patent
Yoshida et al.

(10) Patent No.: US 9,252,644 B2
(45) Date of Patent: Feb. 2, 2016

(54) SERVOMOTOR PRODUCTION METHOD, SERVOMOTOR PRODUCTION DEVICE, SERVOMOTOR, AND ENCODER

(71) Applicant: KABUSHIKI KAISHA YASKAWA DENKI, Kitakyushu-shi (JP)

(72) Inventors: Yasushi Yoshida, Kitakyushu (JP); Yuji Arinaga, Kitakyushu (JP); Shirou Yoshidomi, Kitakyushu (JP); Yasuhiro Matsutani, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 116 days.

(21) Appl. No.: 14/160,009

(22) Filed: Jan. 21, 2014

(65) Prior Publication Data

US 2014/0132124 A1 May 15, 2014

Related U.S. Application Data

(63) Continuation of application No. PCT/JP2011/066664, filed on Jul. 22, 2011.

(51) Int. Cl.

| | |
|---|---|
| *G01D 5/34* | (2006.01) |
| *H02K 11/00* | (2006.01) |
| *H02K 15/00* | (2006.01) |
| *G01D 5/347* | (2006.01) |
| *G01D 5/38* | (2006.01) |

(52) U.S. Cl.
CPC .............. *H02K 11/0026* (2013.01); *G01D 5/34* (2013.01); *G01D 5/3473* (2013.01); *G01D 5/38* (2013.01); *H02K 15/00* (2013.01); *Y10T 29/49004* (2015.01)

(58) Field of Classification Search
USPC ........................ 250/231.13–213.18
See application file for complete search history.

(56) References Cited

U.S. PATENT DOCUMENTS

| | | | |
|---|---|---|---|
| 4,982,084 A | 1/1991 | Ushiyama et al. | |
| 2007/0272840 A1* | 11/2007 | Musha et al. | 250/231.13 |

(Continued)

FOREIGN PATENT DOCUMENTS

| | | |
|---|---|---|
| CN | 101405576 | 4/2009 |
| CN | 101832790 | 9/2010 |

(Continued)

OTHER PUBLICATIONS

International Search Report for corresponding International Application No. PCT/JP2011/066664, Nov. 1, 2011.

(Continued)

*Primary Examiner* — Thanh Luu
(74) *Attorney, Agent, or Firm* — Mori & Ward, LLP

(57) ABSTRACT

This disclosure discloses a servomotor production method of a servomotor including a motor and an encoder. The encoder includes a rotating disk and an optical module. The rotating disk is mounted on a shaft of the motor and includes at least one concentric slit formed around a disk center. The optical module is provided with a light receiving element configured to receive light emitted from a light source and subjected to an action of the concentric slit on a substrate. The servomotor production method includes adjusting a position of the optical module with respect to the rotating disk by using the concentric slit by means of an output of the light receiving element when the optical module is fixed and arranged facing the rotating disk.

16 Claims, 14 Drawing Sheets

(56) References Cited

U.S. PATENT DOCUMENTS

| | | |
|---|---|---|
| 2009/0321621 A1 | 12/2009 | Yoshida et al. |
| 2010/0224768 A1 | 9/2010 | Yoshida et al. |
| 2011/0069390 A1 | 3/2011 | Yoshida et al. |
| 2011/0139971 A1* | 6/2011 | Phillips .................. 250/231.13 |

FOREIGN PATENT DOCUMENTS

| | | |
|---|---|---|
| CN | 102023028 | 4/2011 |
| JP | 63-63716 U | 4/1988 |
| JP | 63-134917 | 6/1988 |
| JP | 03-42518 | 2/1991 |
| JP | 07-255148 | 10/1995 |
| JP | 2002-340623 | 11/2002 |
| JP | 2003-130688 | 5/2003 |
| JP | 2010-249581 | 11/2010 |

OTHER PUBLICATIONS

Written Opinion for corresponding International Application No. PCT/JP2011/066664, Nov. 1, 2011.

Chinese Office Action for corresponding CN Application No. 201180072458.2, May 4, 2015.

Japanese Office Action for corresponding JP Application No. 2013-525449, Feb. 3, 2015.

Japanese Office Action for corresponding JP Application No. 2013-525449, Jul. 9, 2014.

* cited by examiner k : (d1+d2)/d1

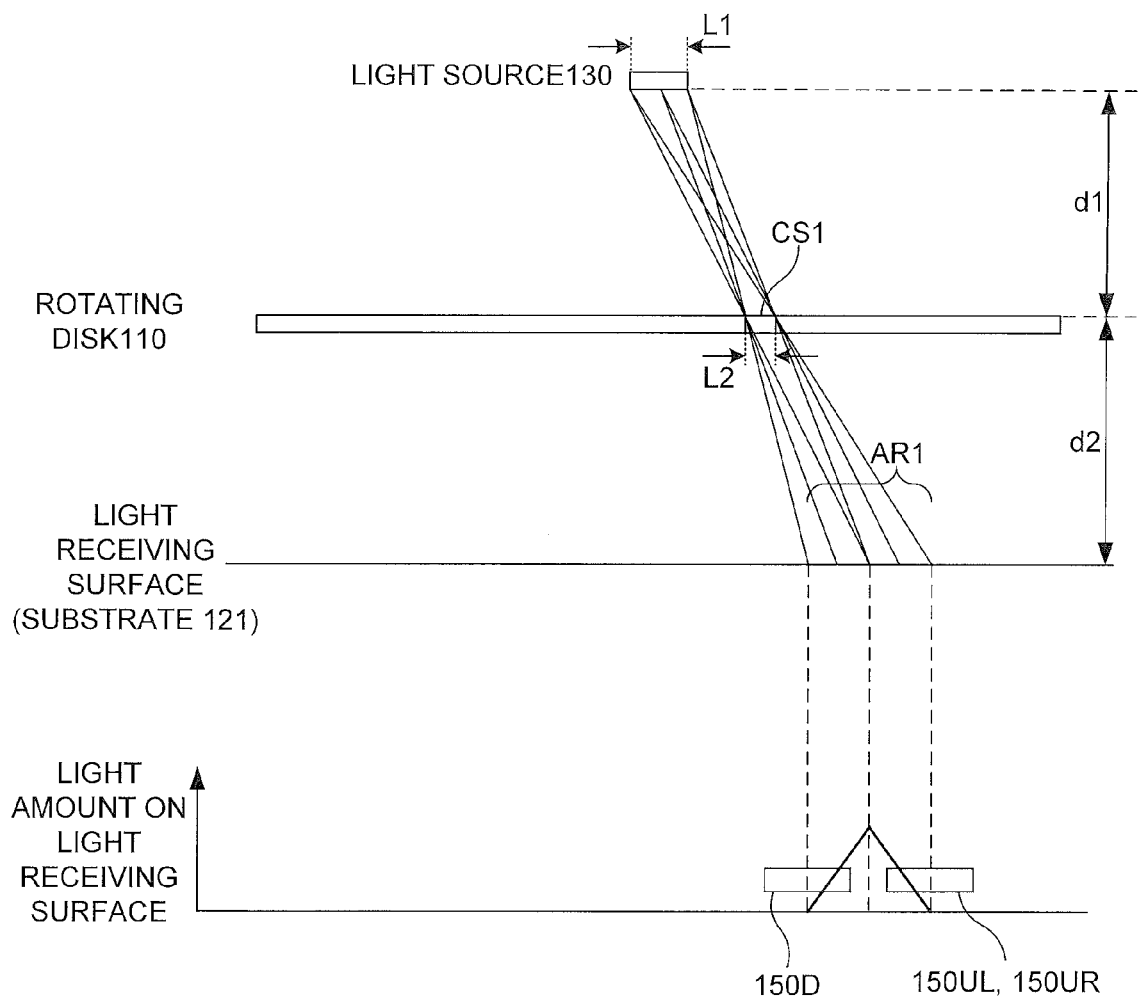

SERVOMOTOR PRODUCTION METHOD, SERVOMOTOR PRODUCTION DEVICE, SERVOMOTOR, AND ENCODER

CROSS-REFERENCE TO RELATED APPLICATION

This is a continuation application PCT/JP2011/066664, filed Jul. 22, 2011, which was published under PCT article 21(2) in English.

FIELD OF THE INVENTION

A disclosed embodiment relates to a production method of a servomotor provided with a motor and an encoder, a servomotor production device, a servomotor, and an encoder.

DESCRIPTION OF THE RELATED ART

An optical encoder in which a rotating disk having a pattern for position adjustment formed and an optical module having a light receiving element for receiving light subjected to an action of the pattern are positioned and arranged facing each other is known.

SUMMARY OF THE INVENTION

According to one aspect of the disclosure, there is provided a servomotor production method of a servomotor including a motor and an encoder. The encoder includes a rotating disk and an optical module. The rotating disk is mounted on a shaft of the motor and includes at least one concentric slit formed around a disk center. The optical module is provided with a light receiving element configured to receive light emitted from a light source and subjected to an action of the concentric slit on a substrate. The servomotor production method includes adjusting a position of the optical module with respect to the rotating disk by using the concentric slit by means of an output of the light receiving element when the optical module is fixed and arranged facing the rotating disk.

BRIEF DESCRIPTION OF THE DRAWINGS

FIG. 17 is an explanatory diagram illustrating the light amount distribution in the case of a triangular shape.

DESCRIPTION OF THE EMBODIMENTS

The present embodiment will be described below while referring to the attached drawings.

<Servomotor>

Figure 1:
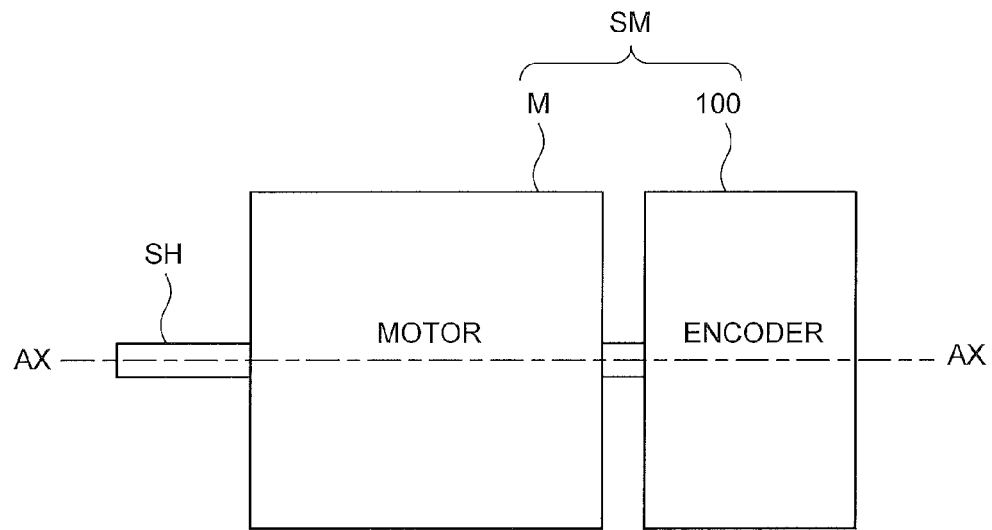
FIG. 1 is an explanatory diagram for explaining an outline configuration of a servomotor according to the present embodiment.

First, while referring to FIG. 1, an outline of a configuration of a servomotor according to the present embodiment will be described. As illustrated in FIG. 1, a servomotor SM has a reflection type encoder 100 as an encoder according to the present embodiment and a motor M. The motor M is an example of a power generation source not including the reflection type encoder 100. The single body of this motor M may be called a servomotor in some cases, but in the present embodiment, the configuration including the reflection type encoder 100 is assumed to be the servomotor SM. The motor M has a shaft SH as a rotary body at least on one end side and outputs a torque by rotating this shaft SH around a rotation axis AX.

The motor M is not particularly limited as long as it is a motor controlled on the basis of positional data. Moreover, the motor M is not limited to an electric motor using electricity as a power source and may be a motor using other power sources such as a hydraulic motor, an air motor, and a steam motor, for example. However, for convenience of explanation, the case in which the motor M is an electric motor will be described below.

The reflection type encoder 100 is connected to an end portion on the side opposite to a torque output end of the shaft SH of the motor M. This reflection type encoder 100 detects a relative position (a relative angle from a reference angle) of a rotating target (which may be the shaft SH itself) of the motor M by detecting a position of the shaft SH and outputs the positional data indicating the position.

An arrangement position of the reflection type encoder 100 is not particularly limited to the example illustrated in the present embodiment. The reflection type encoder 100 may be arranged so as to be directly connected to the output end side of the shaft SH or may be connected to the shaft SH or the like through another mechanism such as a reduction device, a rotating direction converter, and a brake, for example.

Figure 2:
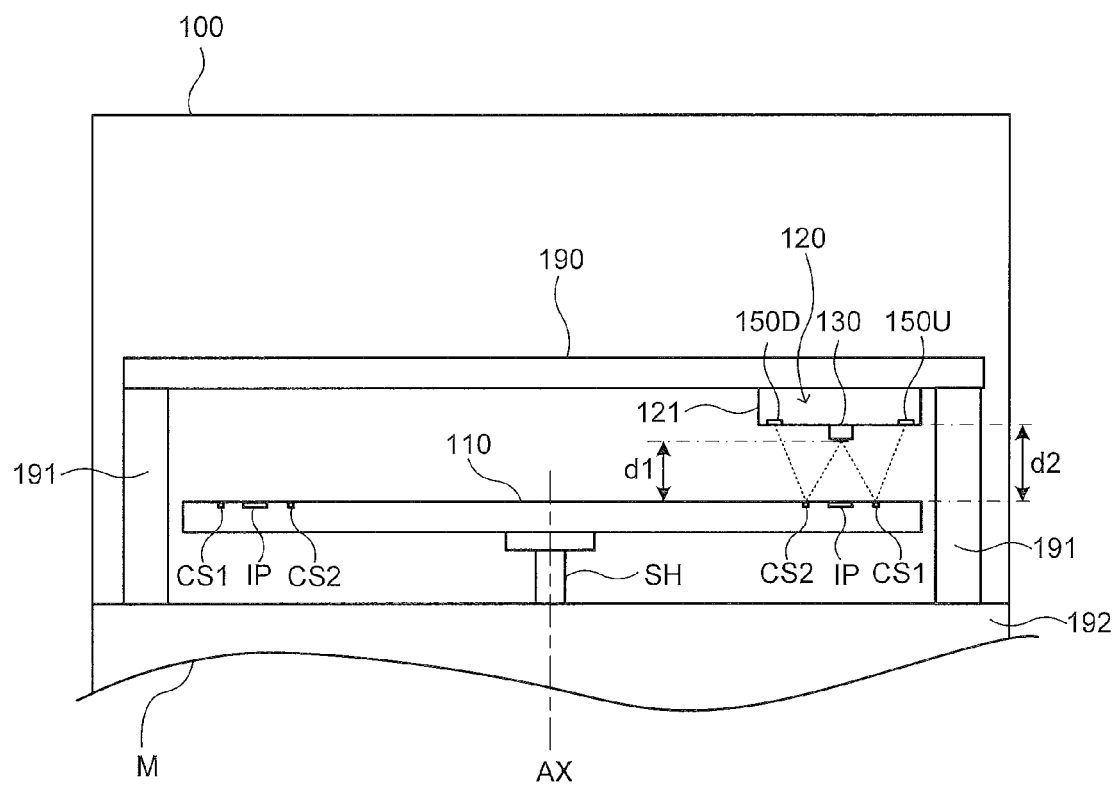
FIG. 2 is an explanatory diagram for explaining an outline configuration of a reflection type encoder according to the present embodiment.

The present embodiment is particularly effective in the case of the servomotor SM having a structure in which a rotating disk 110 of the encoder 100 is directly connected to the shaft SH of the motor M as exemplified in FIGS. 1 and 2. That is because, if the servomotor is to be produced by using the encoder having a rotation axis to which the rotating disk is fixed and a bearing, for example, the rotating disk and the optical module are positioned together with the rotation axis and the bearing and integrally assembled in such encoder and thus, position adjustment of the optical module with respect to the rotating disk is not particularly required. On the other hand, if the encoder 100 does not have the rotation axis or the bearing, and the rotating disk 110 of the encoder 100 is constructed to be directly connected to the shaft SH of the motor M and the optical module 120 is assembled so as to face the rotating disk 110 as in the present embodiment, the encoder 100 cannot be assembled to the motor M with accuracy without position adjustment of the optical module 120 with respect to the rotating disk 110 when the servomotor SM is to be produced. Moreover, since the rotating disk 110 and the optical module 120 have independent support structures, an axial distance (gap) can easily fluctuate between the rotating disk 110 and the optical module 120. However, here, the case in which the rotating disk 110 is directly connected to the shaft SH of the motor M exemplified in FIGS. 1 and 2, that is, the so-called "built-in type" encoder 100 is used is explained as an example, but it is needless to say that the so-called "complete type" encoder 100 in which the rotating disk 110 is connected to a shaft exclusively for the encoder 100 and the shaft is formed connectable to the motor M and the like can be also used.

<Reflection Type Encoder>

Subsequently, the configuration of the reflection type encoder 100 according to the present embodiment will be described while referring to FIGS. 2 to 4. As illustrated in FIG. 2, the reflection type encoder 100 according to the present embodiment has the rotating disk 110 connected to the shaft SH and the optical module 120 arranged facing the rotating disk 110. The optical module 120 is mounted on a printed circuit board 190, and the printed circuit board 190 is disposed on a bracket 192 of the motor M through a spacer 191. By means of the spacer 191, the axial distance between a light source 130 and the surface of the rotating disk 110 is set to become d1, and the axial distance between the surface of the rotating disk 110 and the surface of a substrate 121 (a light receiving surface of each of light receiving elements 140 and 150) to d2.

(Rotating Disk)

Figure 3:
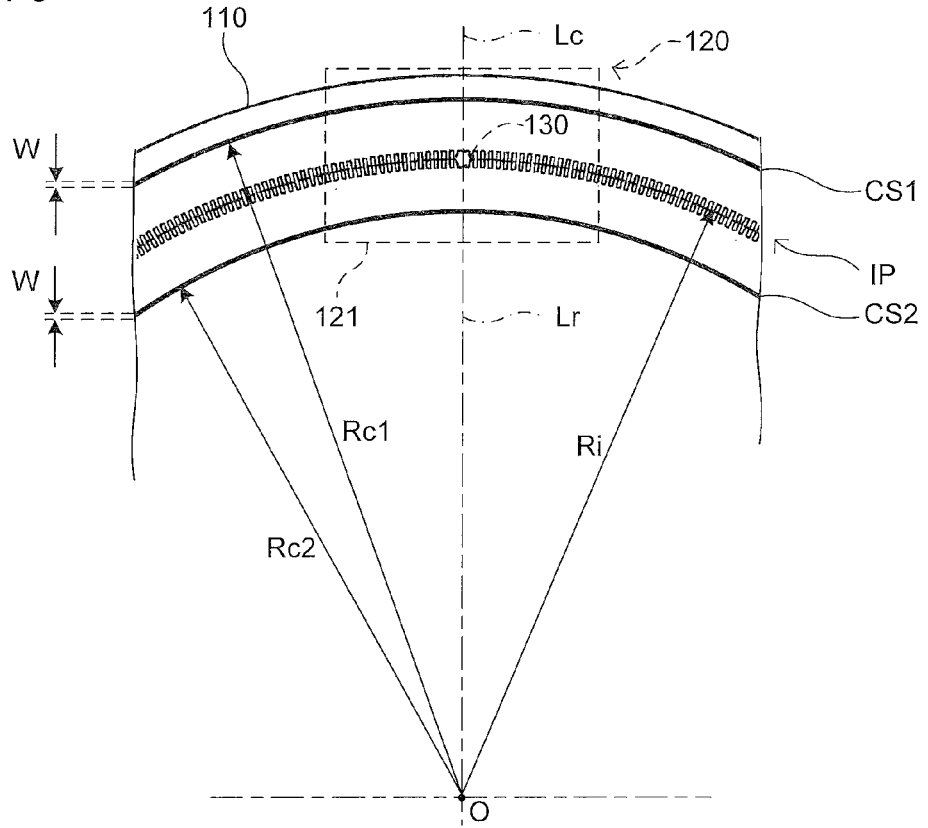
FIG. 3 is a plan view illustrating a part of a surface of a rotating disk provided in the reflection type encoder.

The rotating disk 110 is formed having a disk shape as illustrated in FIG. 3 and is arranged in the manner that a disk center O substantially accords with a rotation axis AX. The rotating disk 110 is connected to the shaft SH rotatable around this rotation axis AX through a hub or the like, for example. Therefore, the rotating disk 110 is arranged rotatably around the rotation axis AX in accordance with rotation of the motor M.

As illustrated in FIG. 3, an incremental pattern IP is formed along a circumferential direction in the rotating disk 110. Moreover, on an outer peripheral side and an inner peripheral side of the incremental pattern IP, two concentric slits CS1 and CS2 are formed around the disk center O. As illustrated in FIG. 3, the optical module 120 is arranged facing the incremental pattern IP in the manner that the light source 130 corresponds to a center position in the radial direction of the incremental pattern IP and thus, it can be considered that the concentric slits CS1 and CS2 are formed on the both sides of the position corresponding to the light source 130 in the radial direction. These concentric slits CS1 and CS2 have the same width W and are formed in the manner that distances in the radial direction from the incremental pattern IP become substantially equal to each other. The rotating disk 110 is formed of a material transmitting or absorbing light, for example. The incremental pattern IP and the concentric slits CS1 and CS2 are patterned by having a reflection slit formed in a concentric circular shape by a method of evaporating a material with high reflectivity, for example, on the rotating disk 110 having a material transmitting or absorbing the light.

The reflection slits are formed at equal intervals at a predetermined pitch on the incremental pattern IP, and the incremental pattern IP has a pattern repeating reflection, absorption or transmission of light at the pitch. On the other hand, each of the concentric slits CS1 and CS2 is formed as one annular reflection slit in a concentric circular shape around the disk center O. Though details will be described later, the concentric slits CS1 and CS2 are used for position adjustment of the optical module 120 with respect to the rotating disk 110 through outputs by light receiving elements 150UL and 150UR for position adjustment which will be described later when the optical module 120 is fixed and arranged facing the rotating disk 110 during production of the servomotor.

(Optical Module)

Figure 4:
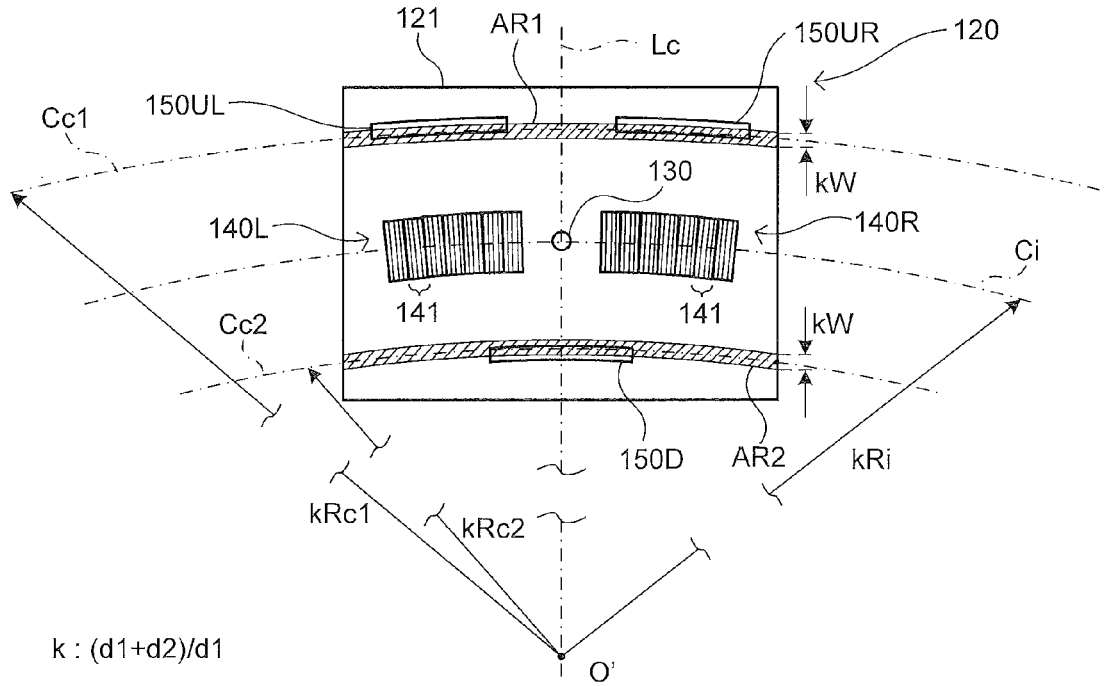
FIG. 4 is an arrangement diagram illustrating arrangement of a light receiving element on a substrate of an optical module provided in the reflection type encoder.

As illustrated in FIG. 4, the optical module 120 has a substrate 121 arranged facing the rotating disk 110. The substrate 121 is constituted smaller than the above-described printed circuit board 190 and arranged on the printed circuit board 190. On a surface on the side facing the rotating disk 110 in this substrate 121, the light source 130 emitting light toward the rotating disk 110, light receiving element groups 140L and 140R for increment including a plurality of light receiving elements 141 for increment receiving reflective light from the incremental pattern IP, light receiving elements 150UL and 150UR for position adjustment receiving reflective light from the concentric slit CS1, and a light receiving element 150D for position adjustment receiving reflective light from the concentric slit CS2 are disposed.

The light receiving elements 150UL and 150UR for position adjustment and the light receiving element 150D for position adjustment are arranged so as to be located at different positions in the radial direction of the rotating disk 110. That is, as illustrated in FIG. 4, the light receiving elements 150UL and 150UR for position adjustment are arranged on one side from the light source 130 in the radial direction, and the light receiving element 150D for position adjustment is arranged on the other side from the light source 130.

The light receiving elements 150UL and 150UR for position adjustment are arranged so as to be symmetrical to a circumferential direction of the rotating disk 110 or in detail, to be axisymmetric to a center line Lc of the substrate 121. The center line Lc is a line substantially according with an axis of symmetry in the circumferential direction of the substrate 121, and the light source 130 is arranged on the center line Lc. Moreover, the light receiving element 150D for position adjustment is also arranged so as to be axisymmetric with respect to the center line Lc.

Moreover, if the rotating disk 110 and the optical module 120 are positioned properly, the light receiving elements 150UL and 150UR for position adjustment are arranged in the manner that a part of the light receiving elements 150UL and 150UR in the radial direction (a part of an inside in the radial direction in this example) is overlapped with a light receiving area AR1 (indicated by hatching in FIG. 4) of the reflective light emitted from the light source 130 and reflected by the concentric slit CS1 and the remaining part is not overlapped. Moreover, the light receiving element 150D for position adjustment is similarly arranged in the manner that a part of the light receiving element 150D in the radial direction (a part of an outside in the radial direction in this example) is overlapped with a light receiving area AR2 (indicated by hatching in FIG. 4) of the reflective light emitted from the light source 130 and reflected by the concentric slit CS2 and the remaining part is not overlapped. Though details will be described later, they are arranged in the manner that the part thereof in the radial direction is overlapped with the light receiving area of the reflective light in order that an output change region of a light receiving signal can be used efficiently in position adjustment.

In the above, the insides in the radial direction of the light receiving elements 150UL and 150UR for position adjustment are overlapped with the light receiving area AR1, and the outside in the radial direction of the light receiving element 150D for position adjustment is overlapped with the light receiving area AR2, but to the contrary, the outsides in the radial direction of the light receiving elements 150UL and 150UR for position adjustment may be overlapped with the light receiving area AR1, and the inside in the radial direction of the light receiving element 150D for position adjustment may be overlapped with the light receiving area AR2. That is, it is only necessary that the overlapped positions with the light receiving areas with the light receiving elements 150UL and 150UR for position adjustment and the light receiving element 150D for position adjustment are opposite to each other in the radial direction.

The optical module 120 is arranged in the manner that, if being positioned properly, as illustrated in FIG. 3, the center line Lc of the substrate 121 accords with a radial line Lr expanding radially from the disk center in the rotating disk 110 (positioning in an inclination direction), and the light source 130 faces the center position in the radial direction (position of a radius Ri from the disk center O) of the incremental pattern IP (positioning in the radial direction). The light receiving elements 150UL, 150UR, and 150D for position adjustment arranged on the substrate 121 at this time are set in the manner that outputs of the light receiving signals become substantially equal to each other.

The light receiving elements 150UL and 150UR for position adjustment are configured in the manner that they have a shape and a direction along the circumferential direction (Cc1 direction in FIG. 4) of the rotating disk 110. The Cc1 direction is a circumferential direction of a radius $kRc1$ around a reference position O' located at a distance of $kRi$ which is k times ($k=(d1+d2)/d1$) of a distance Ri from the light source 130 as illustrated in FIG. 4 when it is assumed that a distance from the disk center O in the rotating disk 110 to a center position of the concentric slit CS1 is Rc1 and a distance from the disk center O to the light source 130 is Ri as illustrated in FIG. 3. The above-described light receiving area AR1 of the reflective light is an area having a width kW which is k times of a width W along this circumferential direction. That is because, as illustrated in FIG. 2, in the reflection type encoder 100, the light emitted from the light source 130 is reflected by the rotating disk 110, and the reflective light is received by the light receiving elements 150UL and 150UR for position adjustment and thus, an enlarged image of the concentric slit CS1 is reflected and projected to the light receiving elements 150UL and 150UR for position adjustment. In the present embodiment, a width in the radial direction of each of the light receiving elements 150UL and 150UR for position adjustment is configured to substantially accord with the width of the light receiving area AR1.

The light receiving element 150D for position adjustment is also configured to have the shape and the direction along the circumferential direction (Cc2 direction in FIG. 4) of the rotating disk 110. The Cc2 direction is, as illustrated in FIGS. 3 and 4, a circumferential direction of a radius $kRc2$ around the reference position O' when it is assumed that a distance from the disk center O in the rotating disk 110 to a center position of the concentric slit CS2 is Rc2. The above-described light receiving area AR2 of the reflective light is an area having the width kW which is k times of the width W along this circumferential direction. The width in the radial direction of the light receiving element 150D for position adjustment is also configured to substantially accord with the width of the light receiving area AR2 similarly to the above.

The light receiving element groups 140L and 140R for increment are divided in the circumferential direction sandwiching the light source 130 between them and arranged in this example. Each of the light receiving element groups 140L and 140R for increment is configured such that a plurality of light receiving elements 141 for increment is arranged in an array manner along the circumferential direction (Ci direction in FIG. 4) of the rotating disk 110. The Ci direction is, as illustrated in FIGS. 3 and 4, a circumferential direction of a radius $kRi$ around the reference position O' when it is assumed that a distance from the disk center O in the rotating disk 110 to a center position of the incremental pattern IP is Ri.

The light receiving element groups 140 for increment and the light receiving elements 150 for position adjustment are preferably formed by using photolithography or the like on the substrate 121 formed of silicon, for example. In this case, the light receiving element groups 140 for increment and the light receiving elements 150 for position adjustment can be formed extremely accurately, and positioning accuracy of the optical module 120 which will be described later can be further improved.

The light receiving elements 150UL and 150UR for position adjustment correspond to an example of a first light receiving element and a second light receiving element described in claims. Moreover, the light receiving element 150D for position adjustment corresponds to one example of a third light receiving element.

<Principle of Position Adjustment>

Subsequently, while referring to FIGS. 5 to 8B, a principle of position adjustment of the optical module 120 with respect to the rotating disk 110 in the present embodiment will be described.

Figure 5:
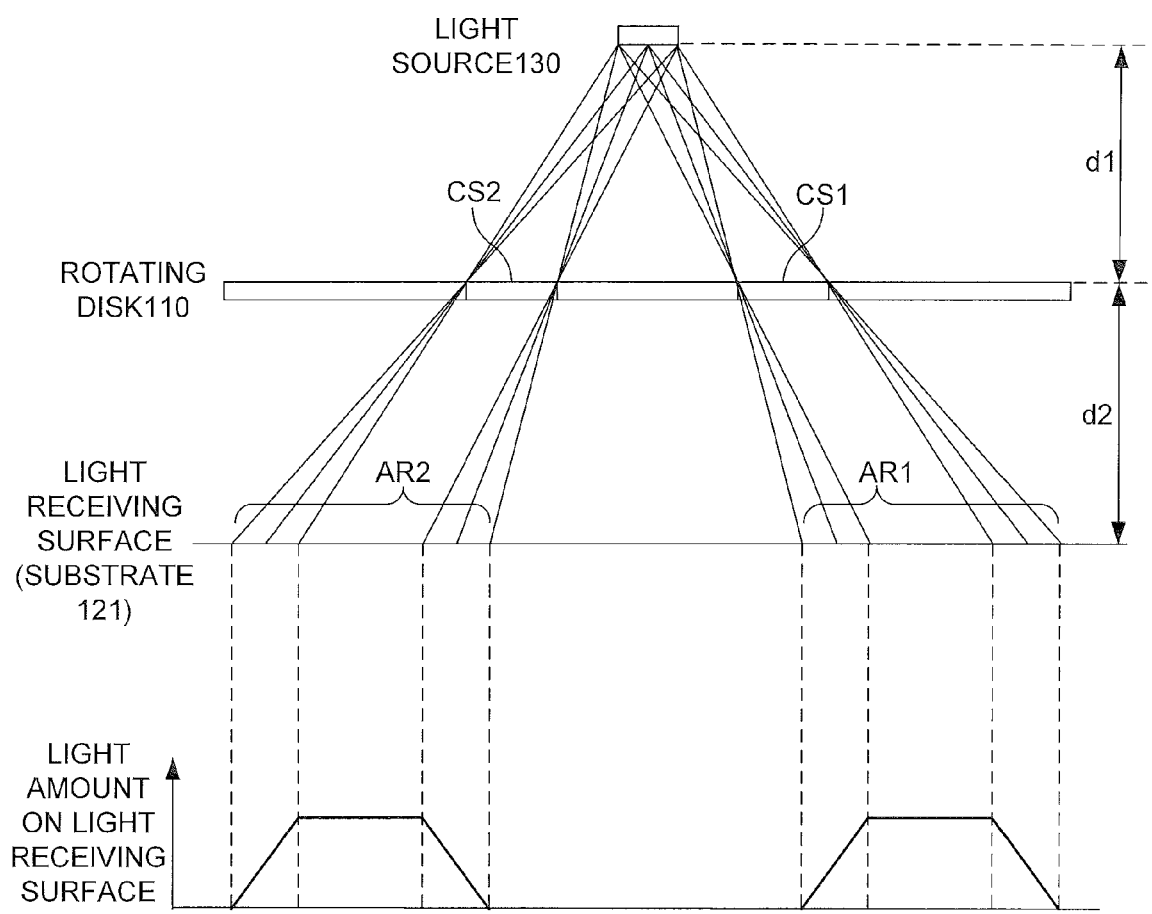
FIG. 5 is an explanatory diagram illustrating light amount distribution on a light receiving surface if a point light source is used.

In the present embodiment, an LED (Light Emitting Diode), for example, is used as the light source 130. Thus, the light source 130 is not a completely ideal point light source but is a light source having a limited light emitting area. In this case, as illustrated in FIG. 5, a light receiving amount on the surface (light receiving surface) of the substrate 121 of the reflective light emitted from the light source 130 and reflected by the concentric slits CS1 and CS2 of the rotating disk 110 decreases on a boundary portion (both end portions in the radial direction) and has trapezoidal light amount distribution in the both cases. For convenience of explanation, FIG. 5 is illustrated in a mode in which the light reflected by the concentric slits CS1 and CS2 has been transmitted.

Subsequently, a change in an output of the light receiving element when the position of the light receiving element for position adjustment changes in the radial direction with respect to the light receiving area with the above-described light amount distribution will be described by using FIG. 6. As described above, the width in the radial direction of each of the light receiving elements 150UL, 150UR, and 150D for position adjustment is substantially equal to the width of each of the light receiving areas AR1 and AR2, but for facilitation of understanding, in FIG. 6, the width of the light receiving element for position adjustment is described smaller (or equal to the width of a light amount change region S in this example).

Figure 6:
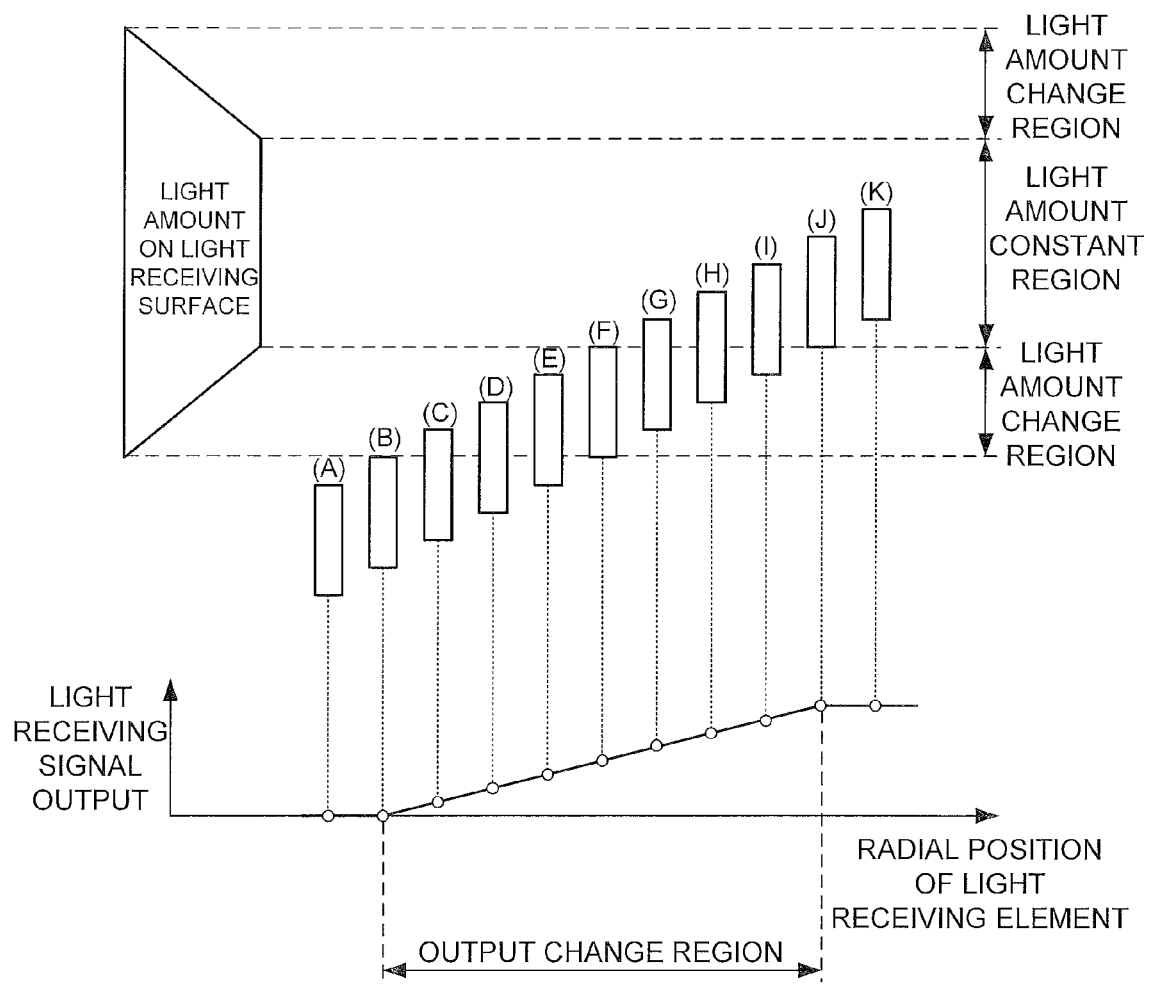
FIG. 6 is an explanatory diagram for explaining a change in an output of the light receiving element for position adjustment when a position of the light receiving element for position adjustment changes in a radial direction with respect to a light receiving area.

As illustrated at (A) and (B) in FIG. 6, if the light receiving element for position adjustment is located out of the light receiving area, the light receiving signal output by the light receiving element for position adjustment is zero. If a part of the light receiving element for position adjustment advances into the light receiving area through movement in the radial direction, as illustrated at (C), (D), and (E) in FIG. 6, the light receiving signal output by the light receiving element for position adjustment gradually increases in accordance with an advance amount. Subsequently, the entire light receiving element for position adjustment enters a state located within the light receiving area at a position indicated by (F) in FIG. 6, but since the light amount distribution in the light receiving area has a trapezoidal shape as described above, in which a light amount constant region where the light amount is constant and the light amount change region where the light amount changes are present, and while a part of the light receiving element for position adjustment is located within the light amount change region, as illustrated at (G), (H), and (I) in FIG. 6, the light receiving signal output by the light receiving element for position adjustment gradually increases at the same rate. After a state in which the entire light receiving element for position adjustment is located within the light amount constant region at the position indicated by (J) in FIG. 6 is established, as illustrated at (K) in FIG. 6, the light receiving signal output by the light receiving element for position adjustment becomes constant.

Since the output of the light receiving element for position adjustment changes within the range from (B) to (J) in FIG. 6 (hereinafter, described as the "output change region"), it is possible to identify the position in the radial direction of the light receiving element for position adjustment. Therefore, in the present embodiment, a part of the light receiving element for position adjustment in the radial direction is arranged to be overlapped with the light receiving area in the manner that the output when the light receiving element for position adjustment is at a proper position is located at a substantially center position of the output change region (the position of (F) in FIG. 6). As a result, if the radial position of the light receiving element for position adjustment is shifted in a direction of advancing into the light receiving area from the proper position, it can be detected within a range from (G) to (J) in FIG. 6, and if the radial position of the light receiving element for position adjustment is shifted in a direction of retreating from the light receiving area from the proper position, it can be detected within a range from (B) to (E) in FIG. 6, and the output change region of the light receiving signal can be efficiently used. Moreover, by using a half value portion of a maximum light amount for position adjustment, an effect of suppressing an influence by fluctuation of the light amount can be also obtained.

Subsequently, an example of a position adjustment operation of the optical module 120 in an inclination direction will be described by using FIGS. 7A and 7B. In the present embodiment, by using the principle described above, position adjustment of the optical module 120 in the inclination direction ($\theta$-direction) with respect to the radial line Lr expanding radially from the disk center in the rotating disk 110 is conducted by moving the printed circuit board 190 in the manner that the outputs of the light receiving elements 150UL and 150UR for position adjustment become substantially equal.

Figure 7A:
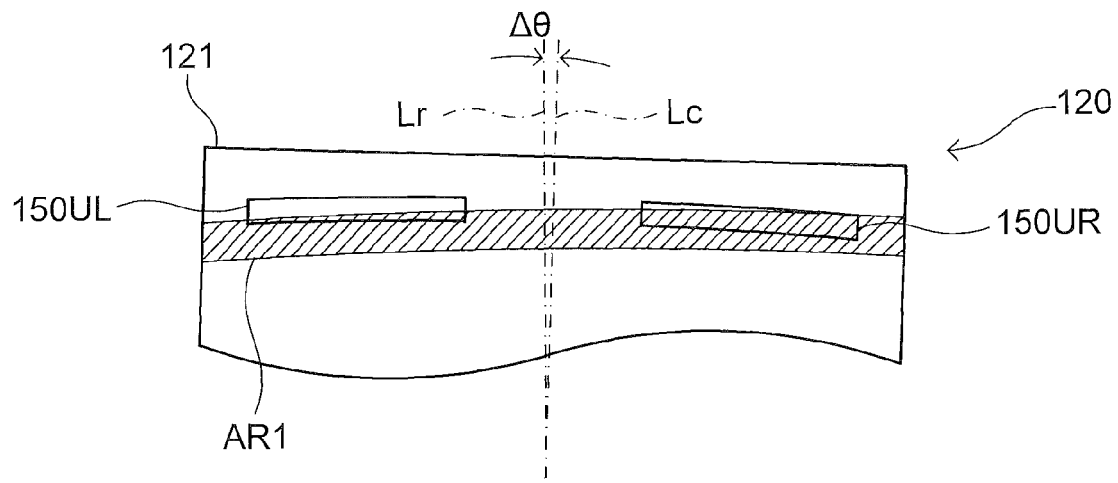
FIG. 7A is an explanatory diagram for explaining an example of a position adjustment operation of the optical module in an inclination direction with respect to the rotating disk.
Figure 7A:
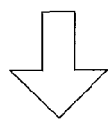

In the example illustrated in FIG. 7A, for example, the center line Lc of the substrate 121 of the optical module 120 is shifted only by $\Delta\theta$ with respect to the radial line Lr expanding radially from the disk center in the rotating disk 110 (not shown in FIGS. 7A and 7B), and a shift amount in the inclination direction is $\Delta\theta$. Since the output of the light receiving element 150UR for position adjustment in this state corresponds to a shift in the direction of advancing into the light receiving area AR1 from the proper position, it corresponds to (I) in FIG. 6, for example. On the other hand, since the output of the light receiving element 150UL for position adjustment in this state corresponds to a shift in a direction retreating from the light receiving area AR1 from the proper position, it corresponds to (C) in FIG. 6, for example.

Figure 7B:
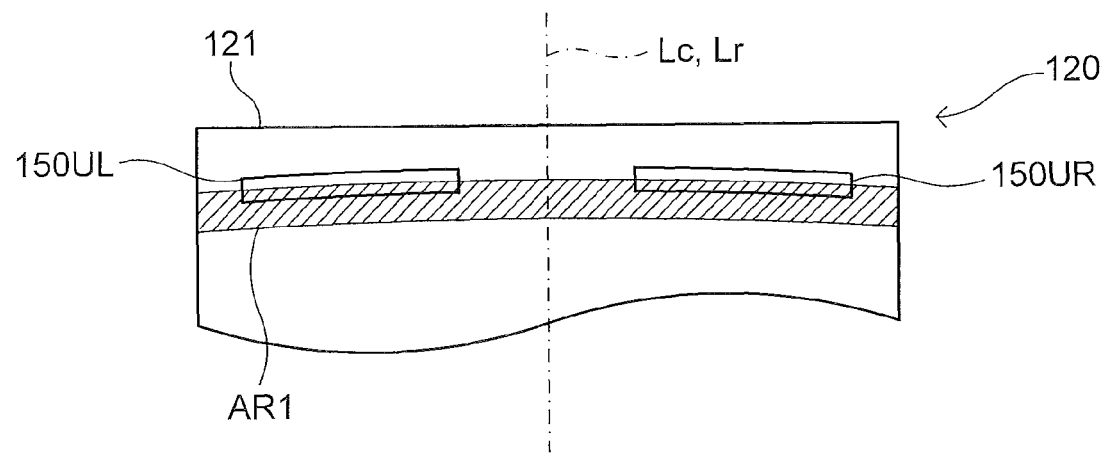
FIG. 7B is an explanatory diagram for explaining an example of a position adjustment operation of the optical module in the inclination direction with respect to the rotating disk.

Therefore, by moving the printed circuit board 190 from the state illustrated in FIG. 7A in the manner that the outputs of the light receiving elements 150UL and 150UR for position adjustment become substantially equal, the optical module 120 is moved only by $\Delta\theta$ in the inclination direction as illustrated in FIG. 7B, and position adjustment in the inclination direction is completed. Since the outputs of the light receiving elements 150UL and 150UR for position adjustment in this state correspond to the proper positions, they correspond to (F) in FIG. 6, respectively.

Subsequently, an example of the position adjustment operation of the optical module 120 in the radial direction will be described by using FIGS. 8A and 8B. Position adjustment of the optical module 120 described above in the radial direction (r-direction) with respect to the rotating disk 110 is conducted by moving the printed circuit board 190 in the manner that either one of the outputs of the light receiving elements 150UL and 150UR for position adjustment which have become substantially equal by the above-described position adjustment of the optical module 120 in the inclination direction ($\theta$-direction) becomes substantially equal to the output of the light receiving element 150D for position adjustment.

Figure 8A:
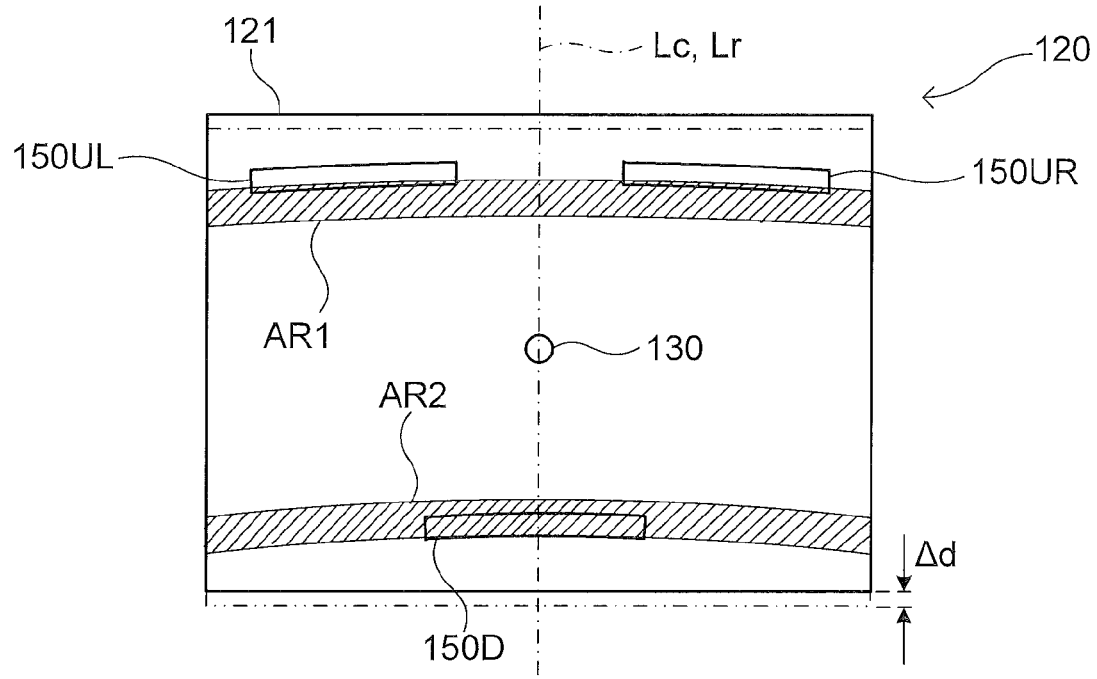
FIG. 8A is an explanatory diagram for explaining an example of a position adjustment operation of the optical module in a radial direction with respect to the rotating disk.
Figure 8B:
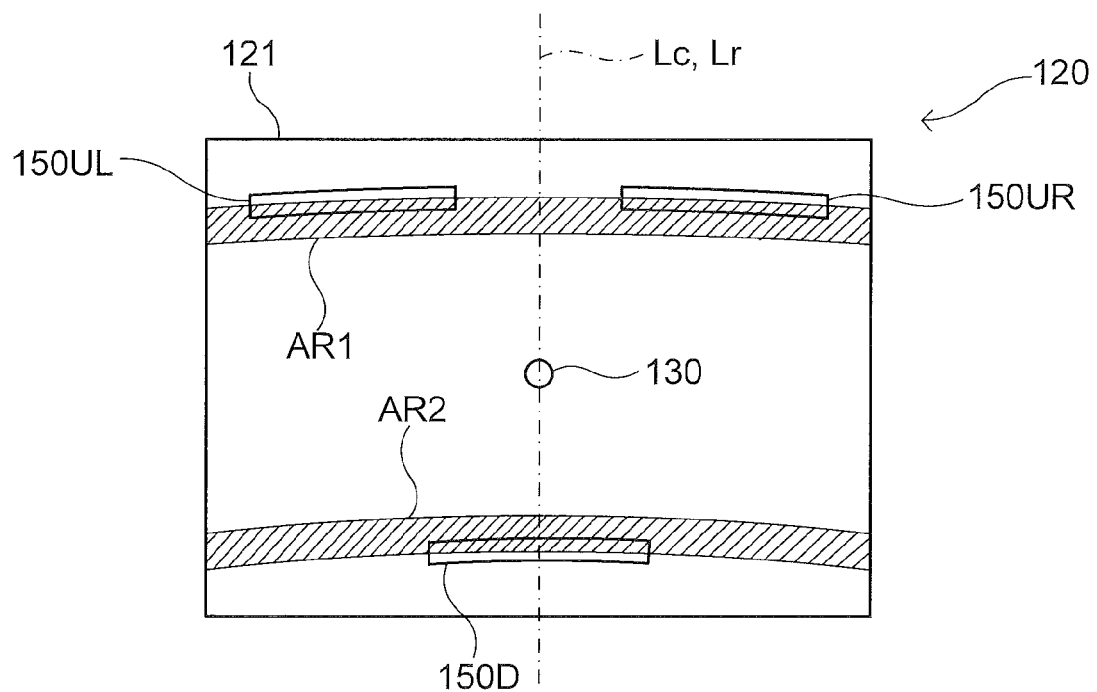
FIG. 8B is an explanatory diagram for explaining an example of a position adjustment operation of the optical module in the radial direction with respect to the rotating disk.

In the example illustrated in FIG. 8A, for example, the substrate 121 of the optical module 120 is shifted only by $\Delta d$ to the outer periphery side in the radial direction of the rotating disk 110 (not shown in FIGS. 8A and 8B) from the proper position illustrated in FIG. 8B, and the shift amount in the radial direction is $\Delta d$. Since the output of the light receiving element 150UR or 150UL for position adjustment in this state corresponds to a shift in the direction of retreating from the light receiving area AR1 from the proper position, it corresponds to (C) in FIG. 6, for example. On the other hand, since the output of the light receiving element 150D for position adjustment in this state corresponds to a shift in the direction of advancing into the light receiving area AR2 from the proper position, it corresponds to (I) in FIG. 6, for example.

Therefore, by moving the printed circuit board 190 from the state illustrated in FIG. 8A in the manner that the output of either one of the light receiving elements 150UL and 150UR for position adjustment becomes substantially equal to the output of the light receiving element 150D for position adjustment, the optical module 120 is moved only by Δd to the inner peripheral side in the radial direction as illustrated in FIG. 8B, and position adjustment in the radial direction is completed. Since the outputs of the light receiving elements 150UL, 150UR, and 150D for position adjustment in this state correspond to the proper positions, they correspond to (F) in FIG. 6, respectively.

<Production Device>

Subsequently, an outline of configuration of the servomotor production device according to the present embodiment will be described while referring to FIG. 9. A servomotor production device MD according to the present embodiment is to adjust the position of the optical module 120 with respect to the rotating disk 110 when the optical module 120 is fixed and arranged facing the rotating disk 110.

Figure 9:
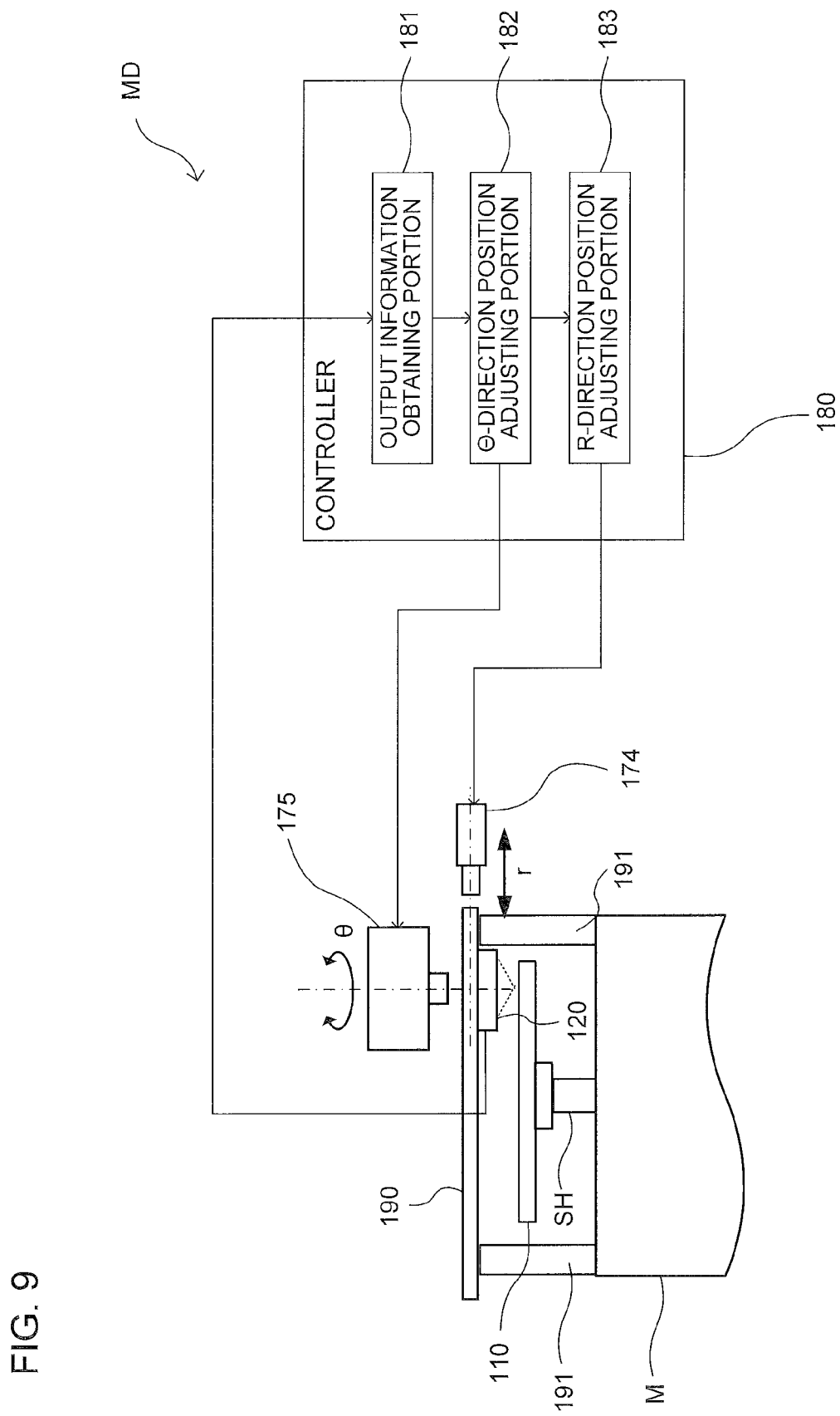
FIG. 9 is an explanatory diagram for explaining an outline configuration of a servomotor production device according to the present embodiment.

As illustrated in FIG. 9, the servomotor production device MD has a rotary motor 175 for conducting position adjustment of the optical module 120 provided with the light receiving elements 150UL, 150UR, and 150D for position adjustment in the inclination direction (indicated by an arrow θ) with respect to the rotating disk 110, a linear motor 174 for conducting position adjustment of the optical module 120 in the radial direction (indicated by an arrow r) with respect to the rotating disk 110, and a controller 180 for controlling the rotary motor 175 and the linear motor 174 on the basis of the outputs of the light receiving elements 150UL, 150UR, and 150D for position adjustment.

As the controller 180, a general-purpose PC or the like is used, for example. This controller 180 incorporates a CPU, which is a central processing unit, a ROM, a RAM and the like, though not shown. The CPU processes signals in accordance with a program (including a program for executing a production method procedure of the servomotor illustrated in FIG. 10 which will be described later) stored in advance in the ROM by using a temporary storage function of the RAM.

Each of the output signals of the light receiving elements 150UL, 150UR, and 150D for position adjustment of the optical module 120 is inputted into an output information acquiring portion 181 of the controller 180. A θ-direction position adjusting portion 182 drives the rotary motor 175 on the basis of the output signals of the light receiving elements 150UL and 150UR for position adjustment in the manner that their outputs become substantially equal and moves the printed circuit board 190 in the inclination direction. Moreover, an r-direction position adjusting portion 183 drives the linear motor 174 on the basis of the output signals of the light receiving elements 150UL, 150UR and 150D for position adjustment in the manner that either one of the outputs of the light receiving elements 150UL and 150UR for position adjustment which have become substantially equal becomes substantially equal to the output of the light receiving element 150D for position adjustment and moves the printed circuit board 190 in the radial direction. As the result of movement of the printed circuit board 190 as above, the position of the optical module 120 is adjusted. The optical module 120 is mounted on the printed circuit board 190, and this printed circuit board 190 is placed on a spacer 191 movably in the radial direction and the inclination direction while a predetermined gap is kept from the rotating disk 110. In the present embodiment, position adjustment of the optical module 120 is conducted by moving the printed circuit board 190 on which the optical module 120 is mounted, but the optical module 120 may be configured so as to be directly moved by the rotary motor 175 and the linear motor 174.

The rotary motor 175 corresponds to an example of a module position adjusting device described in claims, and the θ-direction position adjusting portion 182 corresponds to an example of a control part.

The arrangement positions or the numbers of the linear motor 174 and the rotary motor 175 are not limited to the above but may be changed as appropriate. Moreover, the linear motor and the rotary motor are used as the module position adjusting device in the present embodiment, but any other actuators may be used as long as the printed circuit board 190 can be moved by a slight amount.

<Operation of Production Device (Production Method)>

Subsequently, control contents executed by the CPU of the controller 180 when the above-described position adjustment of the optical module 120 is executed by the servomotor production device MD will be described by using FIG. 10. An entity executing each control processing (Step S20 to Step S35) is actually the CPU of the controller 180, but explanation will be made below while referring to the controller 180 as the entity.

Figure 10:
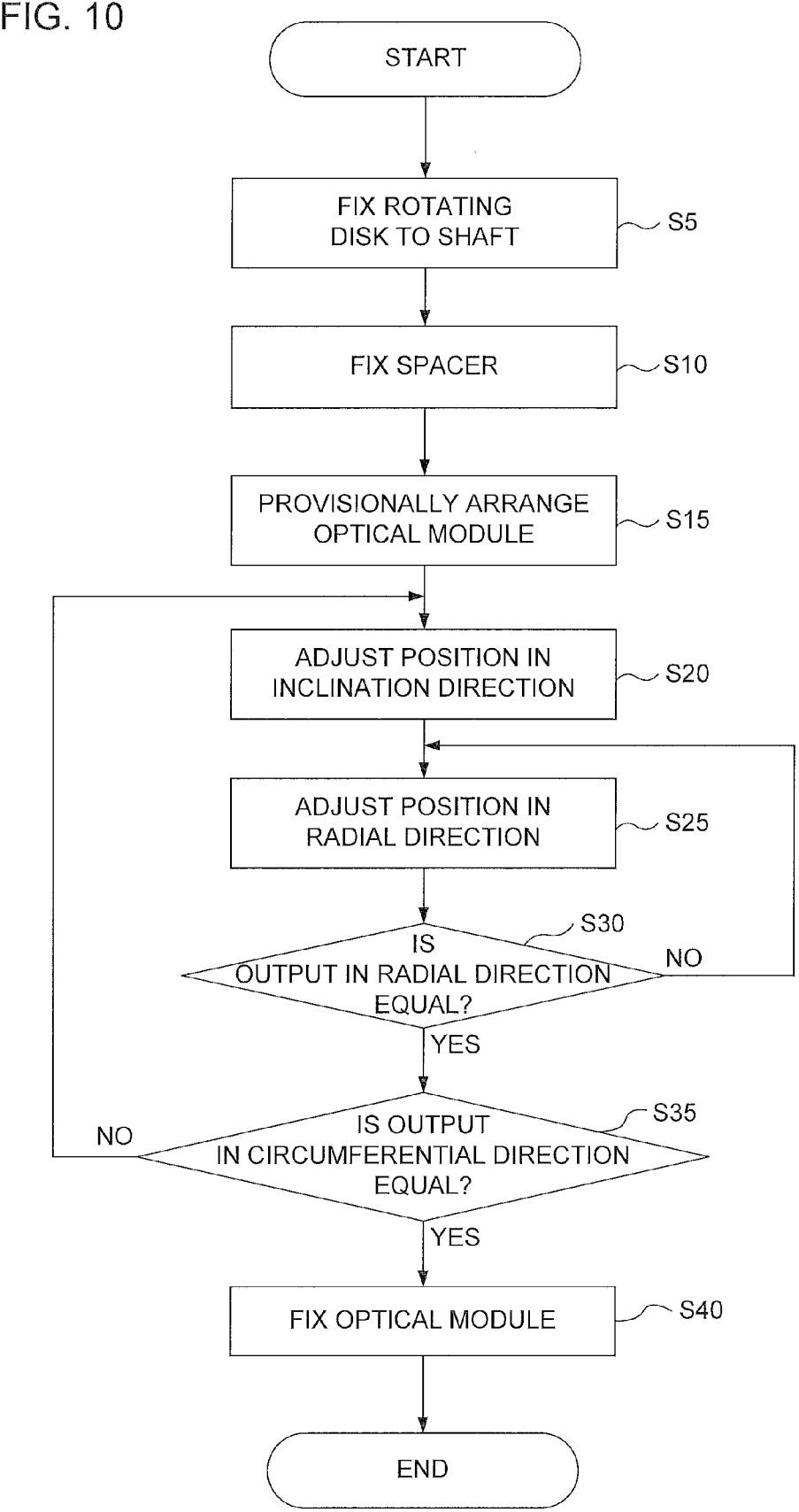
FIG. 10 is a flowchart illustrating control contents during module position adjustment executed by a CPU of a controller.

As illustrated in FIG. 10, first at Step S5, the rotating disk 110 is fixed to the shaft SH without eccentricity by appropriate position adjustment. This fixation is realized by an operator through fixation by a fixing member such as a screw or the like, for example, curing of an adhesive and the like.

At the subsequent Step S10, the spacer 191 is fixed to the bracket 192 of the motor M. This fixation is also realized by the operator.

At the subsequent Step S15, the printed circuit board 190 on which the optical module 120 is mounted is provisionally arranged on the spacer 191. This provisional arrangement is also made by the operator by a method which can move the printed circuit board within a plane using the rotary motor 175 or the linear motor 174 or by a method which enables movement by loosening during the movement.

At the subsequent Step S20, the controller 180 inputs each of the output signals of the light receiving elements 150UL and 150UR for position adjustment by the output information acquiring portion 181. On the basis of the output signals of the light receiving elements 150UL and 150UR for position adjustment, the rotary motor 175 is driven in the manner that these outputs become substantially equal, and position adjustment of the optical module 120 in the inclination direction is conducted by moving the printed circuit board 190 in the inclination direction.

At the subsequent Step S25, the controller 180 inputs each of the output signals of the light receiving elements 150UL, 150UR, and 150D for position adjustment by the output information acquiring portion 181. On the basis of the output signals of the light receiving elements 150UL, 150UR, and 150D for position adjustment, the linear motor 174 is driven in the manner that either one of the outputs of the light receiving elements 150UL and 150UR for position adjustment which have become substantially equal becomes substantially equal to the output of the light receiving element 150D for position adjustment, the position adjustment of the optical module 120 in the radial direction is conducted by moving the printed circuit board 190 in the radial direction.

At the subsequent Step S30, the controller 180 determines whether or not the output of either one of the light receiving elements 150UL and 150UR for position adjustment is substantially equal to the output of the light receiving element 150D for position adjustment. If these outputs are not equal (NO at Step S30), the controller 180 determines that position adjustment of the optical module 120 in the radial direction has not been completed, and the routine returns to Step S25. On the other hand, if these outputs are equal (YES at Step S30), the controller 180 determines that the position adjustment of the optical module 120 in the radial direction has been completed, and the routine proceeds to the subsequent Step S35.

At Step S35, the controller 180 determines whether or not the outputs of the light receiving elements 150UL and 150UR for position adjustment are substantially equal. If these outputs are not equal (NO at Step S35), the controller 180 determines that position adjustment of the optical module 120 in the inclination direction has not been completed, and the routine returns to Step S20. On the other hand, if these outputs are equal (YES at Step S35), the controller 180 determines that the position adjustment of the optical module 120 in the inclination direction has been completed, and the routine proceeds to the subsequent Step S40.

At Step S40, the printed circuit board 190 is fixed to the spacer 191. As a result, the optical module 120 is positioned and fixed. This fixation is realized by the operator through fixation by a fixing member such as a screw or the like, for example, curing of an adhesive and the like. As above, this flow is finished.

In the above, Step S20 to Step S35 correspond to an example of a module position adjustment step and the servomotor production method described in claims.

<Example of Advantages>

In the servomotor SM according to the present embodiment described above, the optical module 120 is provided with the light receiving elements 150UL and 150UR for position adjustment for receiving the reflective light from the concentric slit CS1 of the rotating disk 110. These light receiving elements 150UL and 150UR for position adjustment are arranged on the substrate 121 so as to be symmetric with respect to the circumferential direction of the rotating disk 110. With such configuration, a shift of the optical module 120 in the inclination direction (θ-direction) with respect to the rotating disk 110 appears as a difference in the outputs of the light receiving elements 150UL and 150UR for position adjustment, and thus, by making these outputs substantially equal, the position of the optical module 120 in the inclination direction can be adjusted. As described above, position adjustment of the optical module 120 in the inclination direction can be conducted with accuracy with a simple configuration, and thus, the servomotor SM can be easily produced.

Moreover, by configuring the servomotor production device MD to be provided with the rotary motor 175 for conducting position adjustment of the optical module 120 in the inclination direction with respect to the rotating disk 110 and the controller 180 having the θ-direction position adjusting portion 182 controlling the rotary motor 175 in the manner that the outputs of the light receiving elements 150UL and 150UR for position adjustment become substantially equal, the position adjustment of the optical module 120 in the inclination direction with respect to the rotating disk 110 can be automatically conducted.

Moreover, according to the present embodiment, the following advantages can be also exerted. That is, as the method for conducting position adjustment of the optical module 120 in the inclination direction, an inspection grid in which a plurality of slits is juxtaposed may be disposed on the rotating disk 110, or a reference grid in which a plurality of slits is similarly juxtaposed or by using a position detection pattern of the rotating disk 110 as the inspection grid, a reference light receiving element array may be disposed on the substrate 121 of the optical module 120 separately from the light receiving element for position detection in the manner that position adjustment is conducted on the basis of a light receiving signal obtained by a mutual action between the reference grid and the inspection grid. In this case, the light receiving element becomes relatively large since the light subjected to the actions of the both grids is received, but since the present embodiment is configured such that the light subjected to the action of the concentric slit CS1 disposed on the rotating disk 110 is received by the light receiving elements 150UL and 150UR for position adjustment symmetrically arranged on the substrate 121, and it is only necessary that the width in the radial direction of each of the light receiving elements 150UL and 150UR is substantially equal to the width of the light receiving area AR1 where the light subjected to the action of the concentric slit CS1 reaches on the substrate 121, and the light receiving element can be made smaller. Moreover, the light receiving area can be enlarged by increasing the length in the circumferential direction of each of the light receiving elements 150UL and 150UR for position adjustment. Therefore, as compared with the above-described configuration, the optical module 120 can be made compact.

Moreover, particularly in the present embodiment, the optical module 120 is provided with the light receiving element 150D for position adjustment arranged at a position different from those of the light receiving elements 150UL and 150UR for position adjustment in the radial direction of the rotating disk 110 on the substrate 121. With such configuration, after position adjustment of the optical module 120 in the inclination direction in the manner that the outputs of the light receiving elements 150UL and 150UR for position adjustment become substantially equal, a shift in the radial direction of the optical module 120 with respect to the rotating disk 110 appears as a difference in the output of either one of the light receiving elements 150UL and 150UR for position adjustment which have become substantially equal and the output of the light receiving element 150D for position adjustment. Therefore, by making the output of either one of the light receiving elements 150UL and 150UR for position adjustment and the output of the light receiving element 150D for position adjustment substantially equal, the position of the optical module 120 in the radial direction can be adjusted. As described above, position adjustment of the optical module 120 in the radial direction with respect to the rotating disk 110 can be conducted with accuracy with a simple configuration, and thus, the servomotor SM can be easily produced.

Moreover, by configuring the servomotor production device MD to be provided with the linear motor 174 for conducting position adjustment of the optical module 120 in the radial direction with respect to the rotating disk 110 and the controller 180 having the r-direction position adjusting portion 183 controlling the linear motor 174 in the manner that the output of either one of the light receiving elements 150UL and 150UR for position adjustment becomes substantially equal to the output of the light receiving element 150D for position adjustment, the position adjustment of the optical module 120 in the radial direction with respect to the rotating disk 110 can be automatically conducted.

Figure 11:
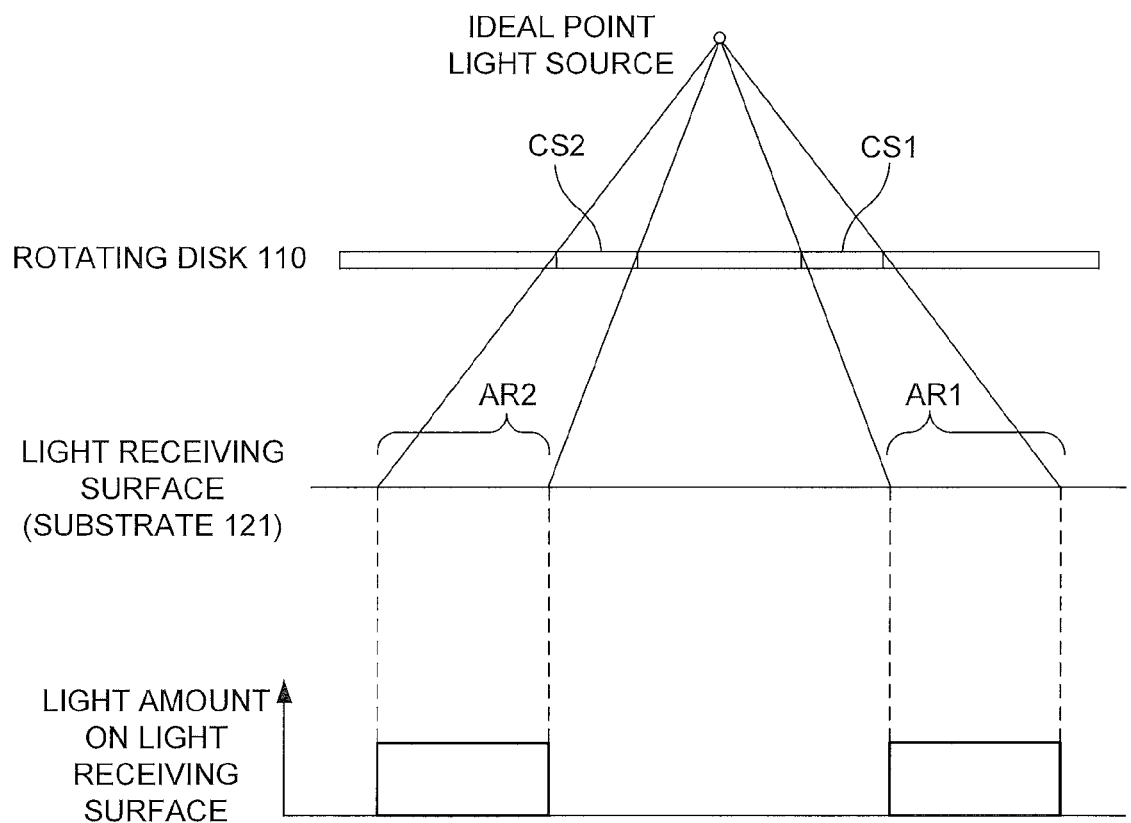
FIG. 11 is an explanatory diagram illustrating the light amount distribution on the light receiving surface if a light source is an ideal point light source.

Moreover, particularly in the present embodiment, a nature that the light amount distribution on the surface (light receiving surface) of the substrate 121 becomes trapezoidal is used by using the light source 130 having a limited light emitting area. The advantages obtained by this will be described by using FIGS. 11 and 12.

If the light source 130 is an ideal point light source not having a light emitting area, for example, as illustrated in FIG.

11, the light receiving amount on the surface (light receiving surface) of the substrate 121 of the reflective light emitted from the light source 130 and reflected by the concentric slits CS1 and CS2 of the rotating disk 110 results in rectangular light amount distribution in any case.

Figure 12:
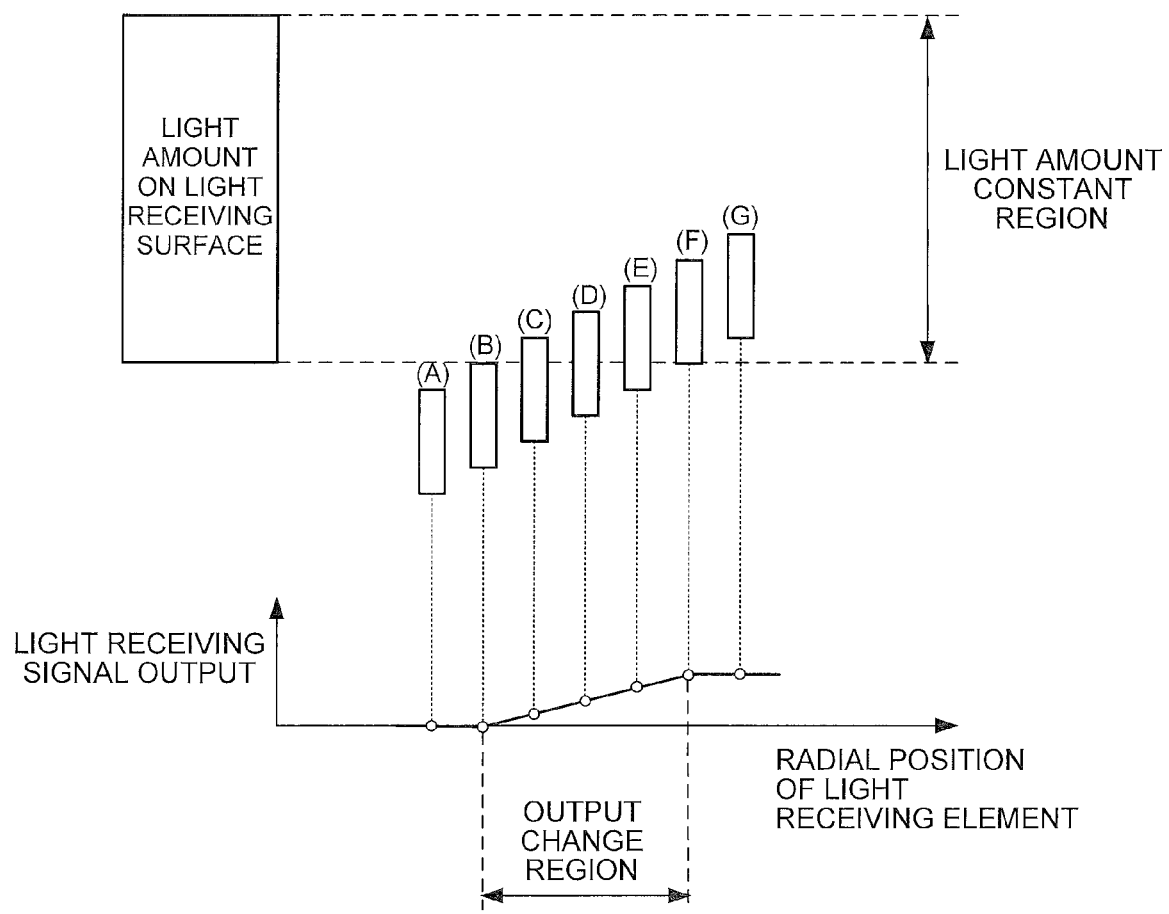
FIG. 12 is an explanatory diagram for explaining a change in the output of the light receiving element for position adjustment when the position of the light receiving element for position adjustment changes in the radial direction with respect to a rectangular light receiving area.

The change in the output of the light receiving element when the position of the light receiving element for position adjustment changes in the radial direction with respect to the light receiving area which is such rectangular light amount distribution is as illustrated in FIG. 12. That is, as indicated at (A) and (B) in FIG. 12, if the light receiving element for position adjustment is located out of the light receiving area, the light receiving signal output by the light receiving element for position adjustment is zero. If a part of the light receiving element for position adjustment advances into the light receiving area by the radial movement, as indicated at (C), (D), and (D) in FIG. 12, the light receiving signal output by the light receiving element for position adjustment gradually increases in accordance with an advance amount. Subsequently, the entire light receiving element for position adjustment is located within the light receiving area at the position indicated at (F) in FIG. 12. At this time, unlike the above-described trapezoidal light amount distribution, since only the light amount constant region in which the light amount is constant is present in the rectangular light amount distribution, after the position indicated at (F) in FIG. 12, the light receiving signal output by the light receiving element for position adjustment becomes constant as indicated at (G) in FIG. 12.

That is, in this case, the range from (B) to (F) in FIG. 12 becomes the output change region, and the radial position of the light receiving element for position adjustment can be identified within this range, but since it is the rectangular light amount distribution, the output change region is small. In this case, in order to enlarge the output change region, the width in the radial direction of the light receiving element for position adjustment should be increased, and integration with other light receiving elements, that is, with the light receiving element groups 140L and 140R for increment, for example, becomes difficult, and size reduction of the optical module 120 becomes difficult.

On the other hand, in the present embodiment, as illustrated in the above-described FIG. 6, a wide range from (B) to (J) in FIG. 6 can be made as output change region by using the light amount change region of the trapezoidal light amount distribution, and the output change region can be enlarged as compared with the above-described case. As a result, the width in the radial direction of the light receiving element for position adjustment can be made smaller, and thus, integration with the other light receiving elements is facilitated, and the size of the optical module 120 can be reduced.

Moreover, particularly in the present embodiment, the rotating disk 110 has the two concentric slits CS1 and CS2 formed on the both sides of the position corresponding to the light source 130 in the radial direction, and the optical module 120 is configured to have the light receiving elements 150UL and 150UR for position adjustment arranged on the one side from the light source 130 on the substrate 121 in the radial direction and the light receiving element 150D for position adjustment arranged on the other side from the light source 130. That is, the light receiving element for position adjustment for conducting position adjustment in the radial direction is configured to be arranged on the both sides in the radial direction of the light source 130. The advantage obtained by this will be described by using FIG. 13.

In general, in the encoder in which the rotating disk 110 and the optical module 120 are arranged facing each other, the axial distance (gap) between the rotating disk 110 and the optical module 120 is set so as to be constant but might be fluctuated due to a tolerance or the like of a thickness of the rotating disk 110. Particularly, if the so-called "built-in type" encoder in which the rotating disk 110 is directly connected to the shaft SH of the motor M is used as in the present embodiment, the position of the rotating disk 110 is influenced by component accuracy, assembling accuracy and the like on the motor M side, and fluctuation can easily occur. If such fluctuation occurs in the distance, in the case of the configuration (the configuration illustrated in FIGS. 15 and 16 which will be described later, for example) in which all the light receiving elements for position adjustment for conducting position adjustment in the radial direction are arranged on the one side of the light source 130 on the substrate 121 in a concentrated manner, for example, the position of the light receiving area in the radial direction fluctuates, and thus, the output of the light receiving element for position adjustment fluctuates, and position adjustment accuracy in the radial direction of the optical module 120 might deteriorate.

Figure 13:
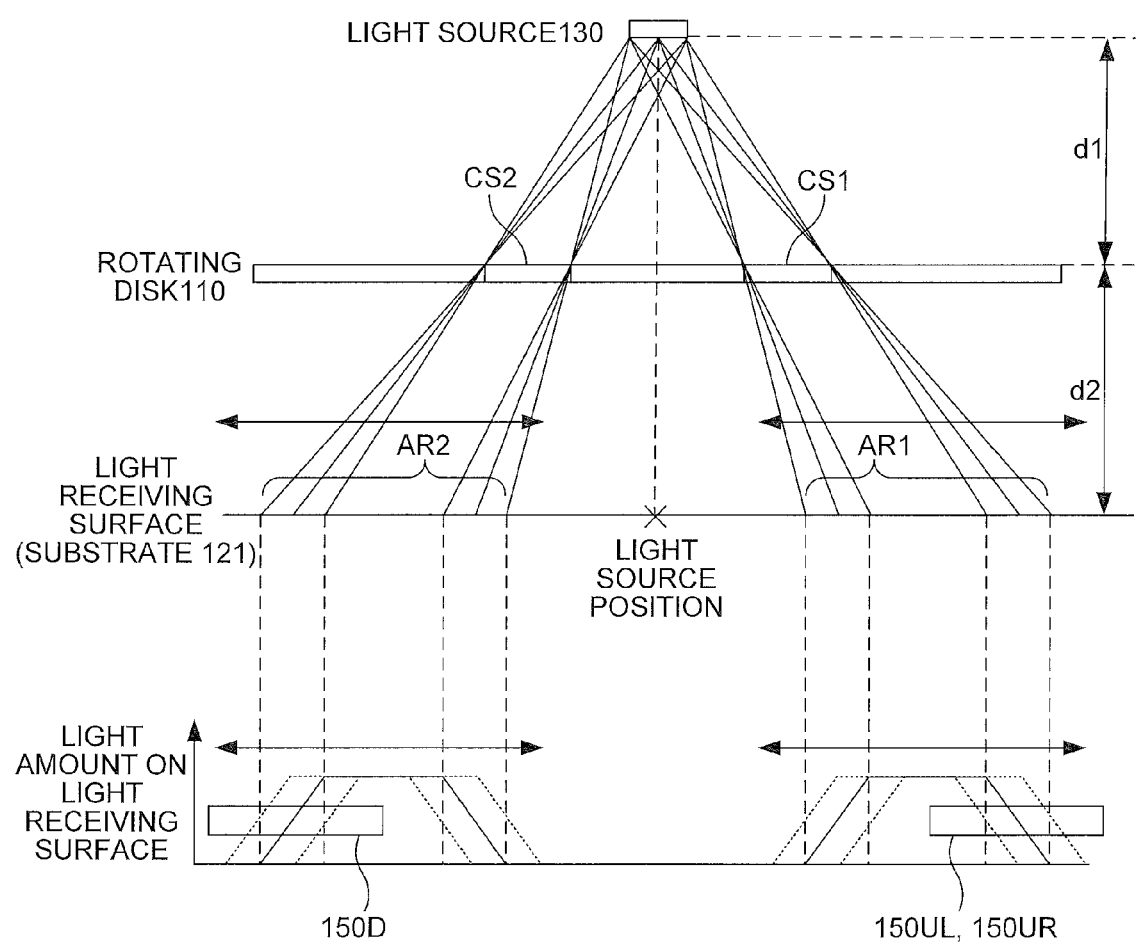
FIG. 13 is an explanatory diagram for explaining position fluctuation of the light receiving area if an axial distance between the rotating disk and the optical module fluctuates.

On the other hand, in the present embodiment, the light receiving elements for position adjustment for conducting position adjustment in the radial direction, that is, the light receiving elements 150UL and 150UR for position adjustment and the light receiving element 150D for position adjustment are configured to be arranged on the both sides in the radial direction of the light source 130. With such configuration, as illustrated in FIG. 13, if fluctuation occurs in the gap between the rotating disk 110 and the optical module 120 (d1 and d2 in FIG. 13), the positions of the two light receiving areas AR1 and AR2 where the light emitted from the light source 130 and reflected by the two concentric slits CS1 and CS2 reaches on the substrate 121 fluctuate so as to get close to/leave away from each other in the radial direction with respect to the light source 130. Even if such positional fluctuation of the light receiving areas AR1 and AR2 occurs, as illustrated in FIG. 13, the overlapped area (that is, the light receiving amount and light receiving signal output) to the light receiving areas AR1 and AR2 of each of the light receiving elements only increases/decreases similarly in the light receiving element 150UL for position adjustment or the light receiving element 150UR for position adjustment and the light receiving element 150D for position adjustment and thus, the position adjustment of the optical module 120 in the radial direction can be conducted with accuracy only by conducting position adjustment in the manner that the outputs of the both accord with each other. Therefore, the influence of fluctuation in the axial distance (gap) between the rotating disk 110 and the optical module 120 can be suppressed. Thus, the configuration of the present embodiment can be considered to be particularly effective if the above-described "built-in type" encoder is used.

Moreover, particularly in the present embodiment, the following advantage can be also obtained. In general, in the transmission type encoder in which the light source and the light receiving element are arranged on one side and on the other side sandwiching the rotating disk between them, and the light emitted from the light source is transmitted through the rotating disk and received by the light receiving element, since the optical module provided with the light receiving element and the rotating disk are arranged close to each other, when the optical module is to be mounted, the operator manually conducts position adjustment of the optical module while checking the positional relationship between the light receiving element and the rotating disk by using a microscope and the like in general. However, if the reflection type encoder is used as in the present embodiment, the optical module and the rotating disk might be arranged relatively far away from each other, and moreover, since the printed circuit board 190 is disposed on which the optical module 120 is mounted so as to cover the rotating disk 110 as illustrated in FIG. 2 described above, visual position adjustment by using a microscope and the like is difficult due to its configuration and arrangement.

On the other hand, according to the present embodiment, since it is not necessary to use a microscope in position adjustment of the optical module 120 as described above, even if the reflection type encoder is used, the position adjustment of the optical module 120 with respect to the rotating disk 110 can be conducted with accuracy.

<Variations and the Like>

The present disclosure is not limited to the above-described embodiment but is capable of various variations within a range not departing from the gist and technical idea thereof.

(1) In the case of configuration of two light receiving elements for position adjustment on inner peripheral side:

In the above-described embodiment, the light receiving element 150D for position adjustment arranged at a position different from the light receiving elements 150UL and 150UR for position adjustment in the radial direction is constituted by one light receiving element, but this may be constituted by two light receiving elements.

Figure 14:
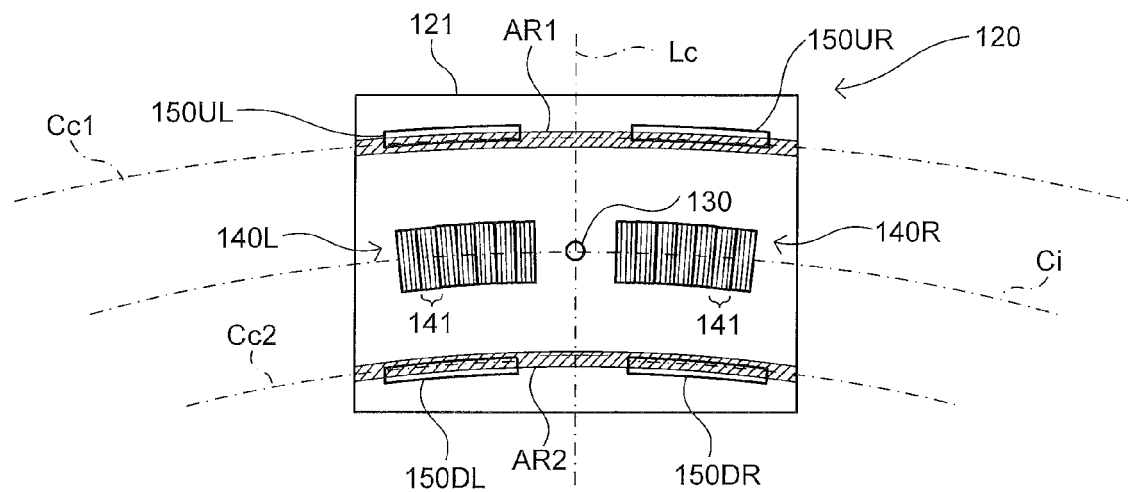
FIG. 14 is an arrangement diagram illustrating arrangement of the light receiving element in a configuration having two light receiving elements for position adjustment on an inner peripheral side.

As illustrated in FIG. 14, in the optical module 120 of this variation, the light receiving elements 150UL and 150UR for position adjustment are arranged on one side in the radial direction from the light source 130, and light receiving elements 150DL and 150DR for position adjustment are arranged on the other side from the light source 130. The light receiving elements 150DL and 150DR for position adjustment are arranged axially symmetrical with respect to the center line Lc of the substrate 121. These light receiving elements 150DL and 150DR for position adjustment are partially overlapped in the radial direction with the light receiving area AR2 (a part of the outside in the radial direction in this example), while the remaining parts are not overlapped, which are the points similar to the above-described light receiving element 150D for position adjustment.

If the optical module 120 of this variation is properly positioned, the light receiving elements 150UL, 150UR, 150DL, and 150DR for position adjustment are set in the manner that outputs of the light receiving signals become substantially equal to each other. Therefore, by moving the printed circuit board 190 in the manner that either one of the outputs of the light receiving elements 150UL and 150UR for position adjustment which have become substantially equal by the above-described position adjustment of the optical module 120 in the inclination direction (θ-direction) becomes substantially equal to either one of the outputs of the light receiving elements 150DL and 150DR for position adjustment, position adjustment of the optical module 120 in the radial direction (r-direction) can be conducted with respect to the rotating disk 110.

In the variation described above, the same advantages as those of the above-described embodiment can be also obtained.

(2) In the case that all the light receiving elements for position adjustment are arranged on one side in the radial direction in a concentrated manner:

In the above-described embodiment, the light receiving elements for position adjustment in the radial direction, that is, the light receiving elements 150UL and 150UR for position adjustment and the light receiving element 150D for position adjustment are configured to be arranged on the both sides of the light source 130 in the radial direction, but this is not limiting, and all the light receiving elements for position adjustment may be arranged on one side in the radial direction of the light source 130 in a concentrated manner. This variation will be described by using FIGS. 15 and 16.

Figure 15:
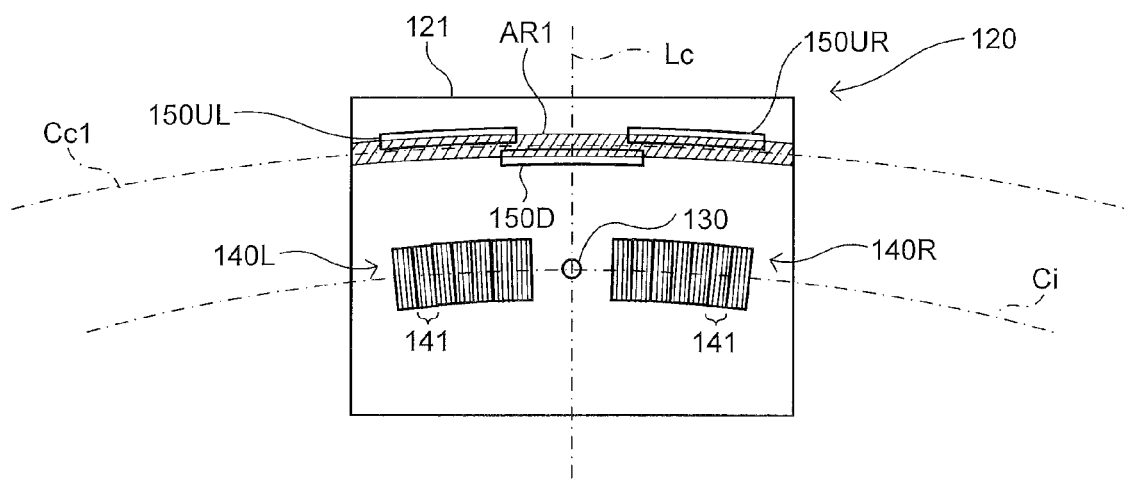
FIG. 15 is an arrangement diagram illustrating arrangement of the light receiving element in a configuration having all the light receiving elements for position adjustment arranged on one side in the radial direction of the light source in a concentrated manner.

In an example illustrated in FIG. 15, the light receiving elements 150UL and 150UR for position adjustment and the light receiving element 150D for position adjustment arranged at a position different from these light receiving elements in the radial direction are arranged on one side (on the outer peripheral side in this example) from the light source 130 on the substrate 121 in the radial direction of the rotating disk 110. On the other hand, though not shown, in the rotating disk 110 of this variation, one concentric slit CS1 is formed only on one side (on the outer peripheral side in this example) from the position corresponding to the light source 130 in the radial direction. Alternatively, the two concentric slits CS1 and CS2 may be formed similarly to the above-described embodiment, but only the concentric slit CS1 is used for position adjustment. The light receiving elements 150UL and 150UR for position adjustment are arranged in the manner that a part of the light receiving elements 150UL and 150UR in the radial direction (a part of the inside in the radial direction in this example) is overlapped with the light receiving area AR1 of the reflective light emitted from the light source 130 and reflected by the concentric slit CS1 and the light receiving element 150D for position adjustment is arranged in the manner that a part of the light receiving element 150D on the opposite side in the radial direction (a part of the outside in the radial direction in this example) is overlapped with the light receiving area AR1.

If the optical module 120 of this variation is properly positioned, the light receiving elements 150UL, 150UR, and 150D for position adjustment are set in the manner that the outputs of the light receiving signals become substantially equal. Therefore, by moving the printed circuit board 190 in the manner that either one of the outputs of the light receiving elements 150UL and 150UR for position adjustment which have become substantially equal by the above-described position adjustment in the inclination direction (θ-direction) of the optical module 120 becomes substantially equal to the output of the light receiving elements 150D for position adjustment, position adjustment of the optical module 120 in the radial direction (r-direction) can be conducted with respect to the rotating disk 110.

Figure 16:
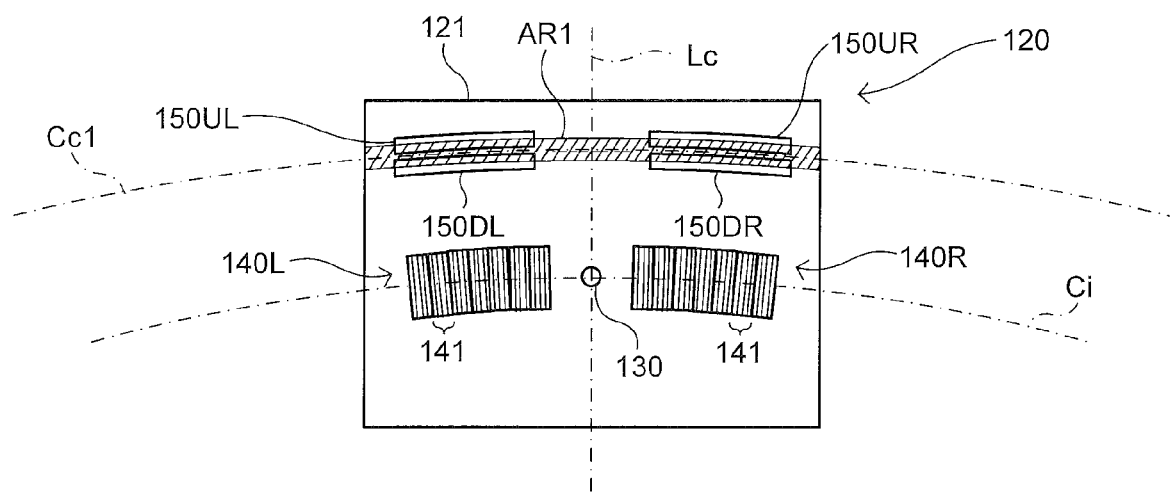
FIG. 16 is an arrangement diagram illustrating arrangement of the light receiving element in a configuration having all the light receiving elements for position adjustment arranged on one side in the radial direction of the light source in a concentrated manner and also having two light receiving elements for position adjustment on the inner peripheral side.

Moreover, an example illustrated in FIG. 16 is a structure in which the light receiving element 150D for position adjustment in the configuration illustrated in FIG. 15 is constituted by two light receiving elements 150DL and 150DR for position adjustment. In this variation, if the optical module 120 is properly positioned, the light receiving elements 150UL, 150UR, 150DL, 150DR for position adjustment are set in the manner that outputs of the light receiving signals become substantially equal to each other. Therefore, by moving the printed circuit board 190 in the manner that either one of the outputs of the light receiving elements 150UL and 150UR for position adjustment which have become substantially equal by the above-described position adjustment in the inclination direction (θ-direction) of the optical module 120 becomes substantially equal to either one of the outputs of the light receiving elements 150DL and 150DR for position adjustment, position adjustment of the optical module 120 in the radial direction (r-direction) can be conducted with respect to the rotating disk 110.

In the examples illustrated in FIGS. 15 and 16, the example in which all the light receiving elements for position adjustment are arranged in a concentrated manner on the outer peripheral side from the light source 130 on the substrate 121 in the radial direction is illustrated, but to the contrary, they may be arranged in a concentrated manner on the inner peripheral side from the light source 130. In this case, only the concentric slit CS2 of the rotating disk 110 is used for position adjustment.

According to the variation described above, since all the light receiving elements 150UL, 150UR, and 150D (150DL, 150DR) for position adjustment are arranged on the one side in the radial direction of the light source 130 in a concentrated manner, it is no longer necessary to dispose the light receiving element for position adjustment on the other side in the radial direction of the light source 130, and the size of the optical module 120 can be reduced in the radial direction.

(3) In the case that light amount distribution of light receiving area is made a triangular shape:

In the above-described embodiment, the output change region can be enlarged without increasing the width in the radial direction of the light receiving element for position adjustment by using the fact that the light amount distribution on the light receiving surface has a trapezoidal shape, but the width of the light receiving region can be reduced by constituting the light amount distribution so as to have a triangular shape, and further integration of the light receiving element can be promoted. This variation is a variation which is effective if all the light receiving elements for position adjustment illustrated in FIGS. 15 and 16 are configured to be arranged on the one side in the radial direction of the light source in a concentrated manner. Therefore, the case in which the optical module 120 is configured as illustrated in FIG. 15 will be described below as an example.

As illustrated in FIG. 17, it is assumed that an axial distance between the light source 130 and the surface of the rotating disk 110 is d1, an axial distance between the surface of the rotating disk 110 and the surface of the substrate 121 (light receiving surface of each of the light receiving elements 140 and 150) is d2, and the size of the light source 130 in the radial direction is L1. In this case, if a width L2 in the radial direction of a concentric slit (CS1 in this example) of the rotating disk 110 satisfies the following formula 1, the light receiving amount on the surface (light receiving surface) of the substrate 121 of the reflective light emitted from the light source 130 and reflected by the concentric slit CS1 of the rotating disk 110 forms triangular shaped light amount distribution.

$$L2 \leq L1 \times \{d2/(d1+d2)\} \qquad \text{(formula 1)}$$

The smaller L2 is made, the smaller the width in the radial direction of the light receiving area AR1 can be made, but a total amount of the light receiving amount also decreases and thus, in order to maximize the light receiving amount while the light amount distribution is kept in a triangular shape, $L2 = L1 \times \{d2/(d1+d2)\}$ is preferable.

By making the light amount distribution triangular as above, the light amount constant region in the light amount distribution is eliminated, and the entire light amount distribution can be made the light amount change region. As a result, similarly to the above-described embodiment, while a wide range is used as the output change region of the light receiving element for position adjustment by using the light amount change region, the width in the radial direction of the light receiving area AR1 can be made smaller. As a result, as illustrated in FIG. 17, the light receiving elements 150UL and 150UR for position adjustment and the light receiving element 150D for position adjustment can be arranged closer in the radial direction, and thus, further integration is made possible, and the size of the optical module 120 can be further reduced.

In the above, the case in which the optical module 120 has the configuration illustrated in FIG. 15 is described as an example, but it may be the configuration illustrated in FIG. 16 or to the contrary to FIGS. 15 and 16, the present disclosure may be applied to a configuration in which the light receiving elements for position adjustment are arranged on the inner peripheral side from the light source 130 in a concentrated manner.

(4) In the case that position adjustment in the radial direction is conducted in the manner that output of light receiving element for position adjustment becomes desired value:

In the above-described embodiment, position adjustment of the optical module 120 in the radial direction (r-direction) with respect to the rotating disk 110 is conducted by moving the printed circuit board 190 in the manner that either one of the outputs of the light receiving elements 150UL and 150UR for position adjustment which have become substantially equal by the position adjustment of the optical module 120 in the inclination direction (θ-direction) becomes substantially equal to the output of the light receiving element 150D for position adjustment, but this is not limiting. For example, output values of the light receiving elements 150UL and 150UR for position adjustment in a state in which the rotating disk 110 and the optical module 120 are properly positioned are measured in advance and stored. As a result, the r-direction position adjusting portion 183 of the controller 180 can conduct position adjustment of the optical module 120 in the radial direction with respect to the rotating disk 110 by driving the linear motor 174 in the manner that the outputs of the light receiving elements 150UL and 150UR for position adjustment which have become substantially equal by the position adjustment in the inclination direction (θ-direction) become the desired values as stored and by moving the printed circuit board 190 in the radial direction.

(5) Others:

Moreover, in the above, the case in which the reflection type encoder in which the light source 130 and the light receiving elements 150L and 150R for position adjustment are arranged on the substrate 121 of the optical module 120 is described as an example, but this is not limiting, and a so-called transmission type encoder in which the light source is arranged facing the substrate 121 provided with the light receiving elements 150UL, 150UR, and 150D for position adjustment by sandwiching the rotating disk 110 may be used. In this case, by forming the concentric slits CS1 and CS2 as through holes in the rotating disk 110, the light receiving elements 150UL, 150UR, and 150D for position adjustment can receive the light emitted from the light source and transmitted through the concentric slits CS1 and CS2 formed in the rotating disk 110 and conduct position adjustment of the optical module 120 with respect to the rotating disk 110. When such transmission type encoder is used, the same advantages as those of the above-described embodiment can be also obtained.

Moreover, in the above, only the incremental pattern IP is formed on the rotating disk 110 as a pattern for position detection, but a serial absolute pattern may be formed. In this case, by disposing a light receiving element group for absolute receiving reflective light from the serial absolute pattern on the substrate 121, an absolute position (an absolute angle) of the shaft SH can be detected.

Moreover, other than those described above, the methods of the above-described embodiment and each of the variations may be used in combination as appropriate.

Though not particularly exemplified, the embodiment and the variations are put into practice with various changes within a range not departing from the gist thereof.

What is claimed is:

1. A servomotor production method of a servomotor comprising a motor and an encoder including a rotating disk mounted on a shaft of the motor, the rotating disk including at least one concentric slit formed around a disk center, each of the at least one concentric slit being one annular slit, the encoder including an optical module provided with a plurality of light receiving elements configured to receive light emitted from a light source and subjected to an action of the concentric slit on a substrate, comprising:

adjusting a position of the optical module with respect the rotating disk by using the concentric slit by means of an output of the plurality of light receiving elements when the optical module is fixed and arranged facing the rotating disk, wherein adjusting the position of the optical module in a rotating direction in such a manner that outputs of a first light receiving element and a second light receiving element arranged symmetrically in a circumferential direction of the rotating disk on the substrate, the first light receiving element and the second light receiving element being included in the plurality of light receiving elements, each of the first light receiving element and the second light receiving element configured to receive light subjected to an action of the one concentric slit formed in the rotating disk, become substantially equal.

2. The servomotor production method according to claim 1, wherein:

adjusting the position of the optical module in a radial direction with respect to the rotating disk in such a manner that at least one of the outputs of the first light receiving element and the second light receiving element having become substantially equal becomes a desired value.

3. The servomotor production method according to claim 2, wherein;

adjusting the position of the optical module in the radial direction with respect to the rotating disk in such a manner that at least one of the outputs of the first light receiving element and the second light receiving element having become substantially equal becomes substantially equal to an output of at least one third light receiving element arranged at a position different from positions of the first light receiving element and the second light receiving element in the radial direction of the rotating disk on the substrate, the at least one third light receiving element being included in the plurality of light receiving elements, the at least one third light receiving element configured to receive light subjected to the action of the one concentric slit or another concentric slit of the rotating disk.

4. A servomotor production device comprising:

a module position adjusting device configured to conduct position adjustment of an optical module in a rotating direction, the optical module including a first light receiving element and a second light receiving element symmetrically arranged in a circumferential direction of the rotating disk on a substrate, each of the first light receiving element and the second light receiving element configured to receive light emitted from a light source and subjected to an action of a concentric slit formed around the disk center of the rotating disk mounted on a shaft of a motor, the concentric slit being one annular slit; and a control part configured to control the module position adjusting device in such a manner that outputs of the first light receiving element and the second light receiving element become substantially equal.

5. A servomotor comprising:

a motor; and an encoder, the encoder comprises:

a rotating disk including at least one concentric slit formed around a disk center, each of the at least one concentric slit being one annular slit; and an optical module provided with a plurality of light receiving elements configured to receive light emitted from a light source and subjected to an action of the concentric slit on a substrate, the optical module includes, as the plurality of light receiving elements, a first light receiving element and a second light receiving element symmetrically arranged in a circumferential direction of the rotating disk on the substrate, and the concentric slit is used for position adjustment of the optical module with respect to the rotating disk in a rotating direction by means of outputs of the first light receiving element and the second light receiving element.

6. The servomotor according to claim 5, wherein:

the optical module includes, as the plurality of light receiving elements, at least one third light receiving element arranged at a position different from positions of the first light receiving element and the second light receiving element in a radial direction of the rotating disk on the substrate.

7. The servomotor according to claim 6, wherein:

the rotating disk includes the one concentric slit formed on one side from a position corresponding to the light source in the radial direction, and the optical module includes the first light receiving element and the second light receiving element arranged on the one side from the position corresponding to the light source on the substrate in the radial direction of the rotating disk and capable of receiving light subjected to an action of the one concentric slit at the same time, as well as the at least one third light receiving element.

8. The servomotor according to claim 7, wherein:

the plurality of light receiving elements is configured in such a manner that a width in the radial direction of the rotating disk becomes substantially equal to a width of an area where the light emitted from the light source and subjected to the action of the concentric slit reaches on the substrate.

9. The servomotor according to claim 6, wherein:

the rotating disk includes the two concentric slits formed on both sides of the position corresponding to the light source in the radial direction, and the optical module includes the first light receiving element and the second light receiving element arranged on the one side from the position corresponding to the light source on the substrate in the radial direction of the rotating disk and capable of receiving light subjected to the action of the concentric slit on the one side, as well as the at least one third light receiving element arranged on the other side from the position corresponding to the light source and capable of receiving light subjected to an action of the concentric slit on the other side.

10. The servomotor according to claim 9, wherein:

the plurality of light receiving elements is configured in such a manner that a width in the radial direction of the rotating disk becomes substantially equal to a width of an area where the light emitted from the light source and subjected to the action of the concentric slit reaches on the substrate.

11. The servomotor according to claim 6, wherein:
the plurality of light receiving elements is configured in such a manner that a width in the radial direction of the rotating disk becomes substantially equal to a width of an area where the light emitted from the light source and subjected to the action of the concentric slit reaches on the substrate.

12. The servomotor according to claim 5, wherein:
the plurality of light receiving elements is configured in such a manner that a width in the radial direction of the rotating disk becomes substantially equal to a width of an area where the light emitted from the light source and subjected to the action of the concentric slit reaches on the substrate.

13. An encoder comprising:
a rotating disk including at least one concentric slit formed around a disk center, each of the at least one concentric slit being one annular slit; and
an optical module provided with a plurality of light receiving elements configured to receive light emitted from a light source and subjected to an action of the concentric slit on a substrate,
the optical module includes, as the plurality of light receiving elements, a first light receiving element and a second light receiving element symmetrically arranged in a circumferential direction of the rotating disk on the substrate, and
the concentric slit is used for position adjustment of the optical module with respect to the rotating disk in a rotating direction by means of outputs of the first light receiving element and the second light receiving element.

14. A servomotor comprising:
a motor; and
an encoder,
the encoder comprises:
  a rotating disk including at least one concentric slit formed around a disk center; and
  an optical module provided with a plurality of light receiving elements configured to receive light emitted from a light source and subjected to an action of the concentric slit on a substrate,
the concentric slit is used for position adjustment of the optical module with respect to the rotating disk by means of an output of the plurality of light receiving elements,
the optical module includes, as the plurality of light receiving elements:
  a first light receiving element and a second light receiving element symmetrically arranged in a circumferential direction of the rotating disk on the substrate, and
  at least one third light receiving element arranged at a position different from positions of the first light receiving element and the second light receiving element in a radial direction of the rotating disk on the substrate,
the rotating disk includes the two concentric slits formed on both sides of the position corresponding to the light source in the radial direction, and the optical module includes the first light receiving element and the second light receiving element arranged on the one side from the position corresponding to the light source on the substrate in the radial direction of the rotating disk and capable of receiving light subjected to the action of the concentric slit on the one side, as well as the at least one third light receiving element arranged on the other side from the position corresponding to the light source and capable of receiving light subjected to an action of the concentric slit on the other side.

15. The servomotor according to claim 14, wherein:
the first light receiving element, the second light receiving element and the at least one third light receiving element are configured in such a manner that a width in the radial direction of the rotating disk becomes substantially equal to a width of an area where the light emitted from the light source and subjected to the action of the concentric slit reaches on the substrate.

16. A servomotor comprising:
a motor; and
an encoder,
the encoder comprises:
  a rotating disk including at least one concentric slit formed around a disk center; and
  an optical module provided with a plurality of light receiving elements configured to receive light emitted from a light source and subjected to an action of the concentric slit on a substrate,
the concentric slit is used for position adjustment of the optical module with respect to the rotating disk by means of an output of the plurality of light receiving elements,
the optical module includes, as the plurality of light receiving elements:
  a first light receiving element and a second light receiving element symmetrically arranged in a circumferential direction of the rotating disk on the substrate, and
  at least one third light receiving element arranged at a position different from positions of the first light receiving element and the second light receiving element in a radial direction of the rotating disk on the substrate,
the rotating disk includes the one concentric slit formed on one side from a position corresponding to the light source in the radial direction,
the optical module includes the first light receiving element and the second light receiving element arranged on the one side from the position corresponding to the light source on the substrate in the radial direction of the rotating disk and capable of receiving light subjected to an action of the one concentric slit at the same time, as well as the at least one third light receiving element, and
the first light receiving element, the second light receiving element and the at least one third light receiving element are configured in such a manner that a width in the radial direction of the rotating disk becomes substantially equal to a width of an area where the light emitted from the light source and subjected to the action of the concentric slit reaches on the substrate.

* * * * *